United States Patent [19]

Mashimo et al.

[11] 4,174,161
[45] Nov. 13, 1979

[54] EXPOSURE CONTROL SYSTEM

[75] Inventors: Yukio Mashimo, Tokyo; Takashi Uchiyama; Kanehiro Sorimachi, both of Yokohama, all of Japan

[73] Assignee: Canon Kabushiki Kaisha, Tokyo, Japan

[21] Appl. No.: 797,640

[22] Filed: May 17, 1977

Related U.S. Application Data

[60] Division of Ser. No. 414,455, Nov. 9, 1973, Pat. No. 4,063,257, which is a continuation-in-part of Ser. No. 301,779, Oct. 30, 1972, abandoned, which is a continuation of Ser. No. 85,438, Oct. 30, 1970, abandoned.

[30] Foreign Application Priority Data

| Nov. 6, 1969 | [JP] | Japan | 44-88873 |
| Dec. 27, 1969 | [JP] | Japan | 44-1328 |
| Dec. 27, 1969 | [JP] | Japan | 44-1329 |
| Sep. 21, 1970 | [JP] | Japan | 45-83119 |

[51] Int. Cl.$^2$ .............................................. G03B 7/16
[52] U.S. Cl. .................................. 354/33; 354/31; 354/38; 354/139

[58] Field of Search ................. 354/27, 31, 32, 33, 354/34, 38, 42, 49, 59, 129, 139

[56] References Cited

U.S. PATENT DOCUMENTS

| 3,457,844 | 7/1969 | Kitai | 354/32 |
| 3,511,144 | 5/1970 | Gotze | 354/34 |
| 3,633,476 | 1/1972 | Yazaki | 354/34 |
| 3,687,028 | 8/1972 | Rentschler | 354/32 |
| 3,688,663 | 9/1972 | Uchiyama et al. | 354/34 |
| 3,720,144 | 3/1973 | Uchiyama | 354/34 |
| 3,750,544 | 8/1973 | Akiyama | 354/34 |
| 3,855,601 | 12/1974 | Uchiyama et al. | 354/34 |

*Primary Examiner*—Russell E. Adams
*Attorney, Agent, or Firm*—Toren, McGeady and Stanger

[57] ABSTRACT

In the exposure control system disclosed, a first photoelectric element responds to light from a scene to be photographed. A second photoelectric element is a spot sensor set to respond from a portion of the scene to be photographed. An exposure control circuit which is coupled to the first and second photoelectric elements controls the shutter and aperture on the basis of at least the relationship between the responses of the first and second photoelectric elements.

19 Claims, 26 Drawing Figures

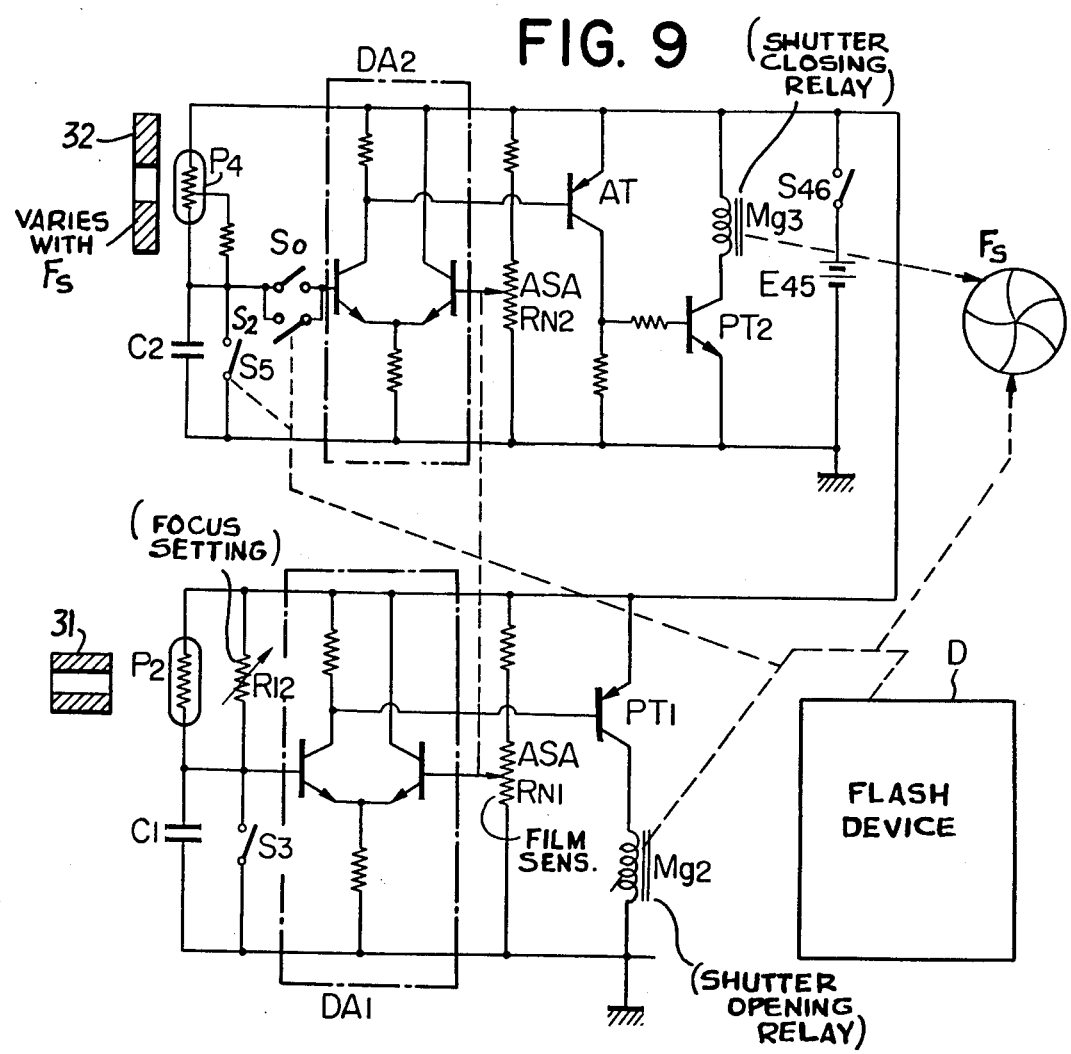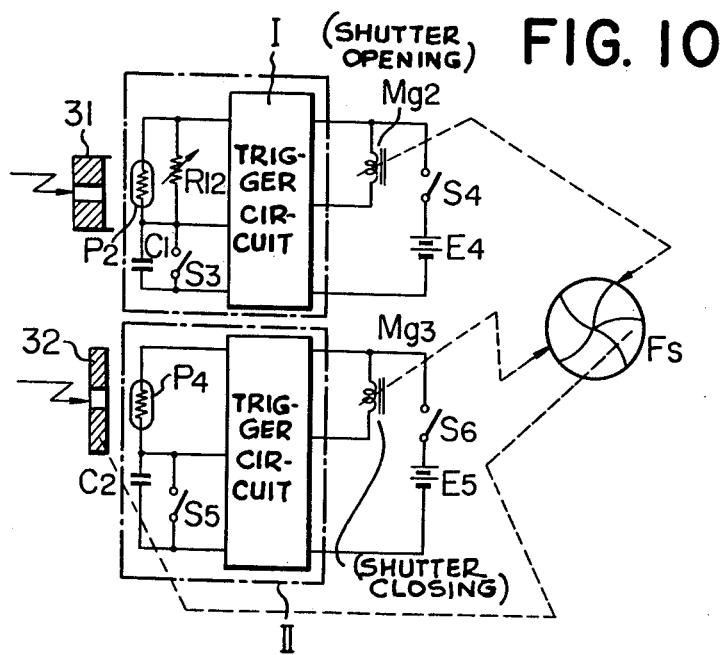

EXPOSURE CONTROL SYSTEM

REFERENCE TO COPENDING APPLICATION

This is a division of application Ser. No. 414,455 filed Nov. 9, 1973, now U.S. Pat. No. 4,063,257 which is a Continuation-in-Part application of application Ser. No. 301,779 filed Oct. 30, 1972 now abandoned, which in turn is a continuation of Ser. No. 85,438 filed Oct. 30, 1970 now abandoned.

BACKGROUND OF THE INVENTION

This invention relates to photographic exposure control systems, and in particular to exposure control systems for appropriately exposing both the main object and the remainder of the overall scene being photographed, especially when flash illumination is used.

Hitherto known mechanisms have compensated for insufficient brightness of an object being photographed by momentarily illuminating the object, or subject, with a flash illuminant such as a xenon discharge lamp or flash bulb.

However, to use the light from a flash apparatus, it is necessary to compute the value of the diaphragm aperture in a camera by means of a formula based upon the amount of light from the flash illuminant. With existing systems, the sensitivity in ASA units of the film being used and the distance to the object being photographed is entered into the computation before the iris of the camera is adjusted to the resulting value. This arrangement selects the distance from the camera to the main object from all the other objects being photographed, for adjusting the diaphragm aperture of the camera. This makes the exposure appropriate for the portion of the scene containing the main object.

However, even when the main object to be flash illuminated and photographed may be dim, from the practical point of view its brightness is very rarely zero. The natural or available light affords it some brightness. Thus the additional illumination provided by the flash unit on the basis of the formula involving film sensitivity, flash intensity, and distance to the main object may result in an overexposed frame. Nevertheless, most objects to be photographed with flash are not significantly overexposed because the natural or available light is generally considered.

When the brightness of the main object in an overall scene to be photographed exceeds a predetermined level, such as when flash is used in daylight, the aperture setting based upon the aforementioned flash computation is likely to create an overexposed picture.

U.S. Pat. No. 3,464,332 discloses facilities for solving some of these defects by utilizing a flash bulb having a comparatively long illumination period and entering into the diaphragm computation both the anticipated light level of the flash illuminated main object and the distance to the main object. This establishes a coarse exposure for the main object. Subsequently the diaphragm is varied by coupling it with a diaphragm disposed in front of a photocell that controls the shutter time constant circuit in response to the light received by the photocell so as to vary the shutter time and perform a fine adjustment on the exposure system.

In such a system when the main object is dim, an appropriate exposure is obtained for the portion of the overall scene containing the main object through this preset diaphragm, by closing the shutter after illumination of the flash bulb is completed. However, when the portion of the overall scene containing the main object has been illuminated by available or natural light, the photocell becomes sensitive to the illumination of the flash bulb and causes the shutter period to be shortened in order to prevent overexposure. For instance, the shutter is adapted to close before the period of flash bulb illumination is completed so as to eliminate any unnecessary exposure when the brightness of the main object is quite high.

The term "available light" as used herein conforms to the term generally used by photographers when speaking of "available light photography." In the broad sense it includes both natural and artificial illumination that may happen to be present when a photograph is being taken, but which is not specifically provided by the photographer for photographic purposes. Thus it may include the artificial illumination normally provided indoors by conventional incandescent or fluorescent household lamps and any illumination passing through the window from outside. In a specific sense the term is used for indoor photography with such light that happens to be immediately available.

In the nature of things a photograph may be divided into two parts, namely the portion containing the main object or the essential part of the main object being photographed, e.g., the subject, and the background or remainder of the scene. Thus setting the exposure only for the subject of the photograph does not necessarily create an appropriate exposure for the background or an appropriate average exposure for the whole picture.

The foregoing defects are caused by the fact that a photograph is composed of the portion containing the main object and the remainder of the scene, e.g. the subject and the background, and the distance to the camera of each and the brightness of each is likely to be different. To explain this in more detail, finely adjusting the exposure to be appropriate for the portion of the photograph containing the main object from among all those objects to be photographed does not appropriately expose the remaining portions of the scene. Thus the resulting picture is adjusted for appropriate exposure only for the portion containing the main object. Usually such a procedure cannot help but improperly expose the background or remaining portions of the scene.

A striking example of the foregoing defect occurs in pictures involving a back-lighted person at the seaside, namely where both the sunshine and the sea are behind the person constituting the main object. In such a case, the subject is back-lighted. The brightness of the background, namely the seaside, is much higher than that of the person. The brightness of the person is apt to be insufficient. Therefore a diaphragm aperture is set to provide appropriate exposure for the subject with flash illumination. The procedure is capable of properly exposing the main object illuminated by flash. On the other hand, the exposure is improper for the background. Thus the overall photograph is inappropriately exposed.

An object of the present invention is to eliminate the aforementioned drawbacks.

Another object of the invention is to provide an exposure control system for flash photography which produces an appropriate exposure of both the subject and the background being photographed.

Yet another object of the invention is to provide an exposure control system usable with a flash apparatus and involving both the iris and the shutter speed.

SUMMARY OF THE INVENTION

According to a feature of the invention these objects are attained in whole or in part, by adjusting the iris for momentary short flash illumination and the shutter to a speed longer than the flash and long enough to accommodate the background illumination.

According to another feature of the invention, the diaphragm aperture of the iris is adjusted on the basis of the distance to the main object and the intensity of the intended flash illumination as well as the sensitivity of the film, and the shutter speed is adjusted on the basis of an average photometric measurement which is taken with a light receiving element which does not respond substantially to the flash but controls the shutter so that the shutter speed produces an appropriate exposure for the background. Alternately, the shutter speed and diaphragm aperture are variable after the flash and adjusted to obtain an appropriate exposure both for the subject illuminated by the flash and a daylight background.

According to another feature of the invention the light receiving element is in the form of a conventional photoelectric transducer such as a photoconductive cell or a sun battery, particularly of the type having photosensitivity in the visible range of light.

According to another feature of the invention, the photoelectric transducer has a slow response which avoids instantaneous changes caused by rapid flash illumination such as produced by a flash bulb or the xenon discharge lamp of an electronic flash device.

According to another feature of the invention the photoelectric transducer has a characteristic which causes it to respond mainly to daylight.

According to another feature of the invention the photoelectric transducer responds to the available light rather than to the rapidly varying flash illumination. The term photoelectric element, light receiving element, or photoelectric transducer are used herein interchangeably and include photoresistors and other types of photocells.

According to another feature of the invention, objects of the invention are attained at least in part by setting the iris of a camera on the basis of a predetermined relationship between a guide number, film sensitivity, F setting and a focus setting, and by setting a shutter control mechanism on the basis of a second relationship between the object brightness, film sensitivity, and square of the F setting, and by synchronizing a flash with an exposure control mechanism.

According to another feature of the invention first photoelectric means respond to the overall scene, second photoelectric means perform a spot measurement of the subject, and exposure control means expose the film on the basis of the relationship between the two photoelectric means.

These and other features of the invention are pointed out in the claims. Other objects and advantages of the invention will be evident from the following description when read in light of the accompanying drawings.

BRIEF DESCRIPTION OF THE DRAWINGS

FIGS. 8-1, 8-2, 8-3, 8-4, and 8-5 are graphs showing the blade opening in response to time with indications of the illumination of a flash device superposed thereon.

FIG. 9 is a circuit diagram showing an embodiment which operates in accordance with the mode shown in FIG. 8-1.

FIGS. 10, 11, 12, 14 and 15 illustrate other circuits embodying features of the present invention.

FIG. 16-1 is a somewhat schematized front view illustrating the mechanical construction of an exposure control device embodying features of the invention.

FIG. 16-2 is a view of a structure similar to that of FIG. 16-1 but slightly modified and also embodying features of the invention.

DETAILED DESCRIPTIONS OF PREFERRED EMBODIMENTS

Figure 1:
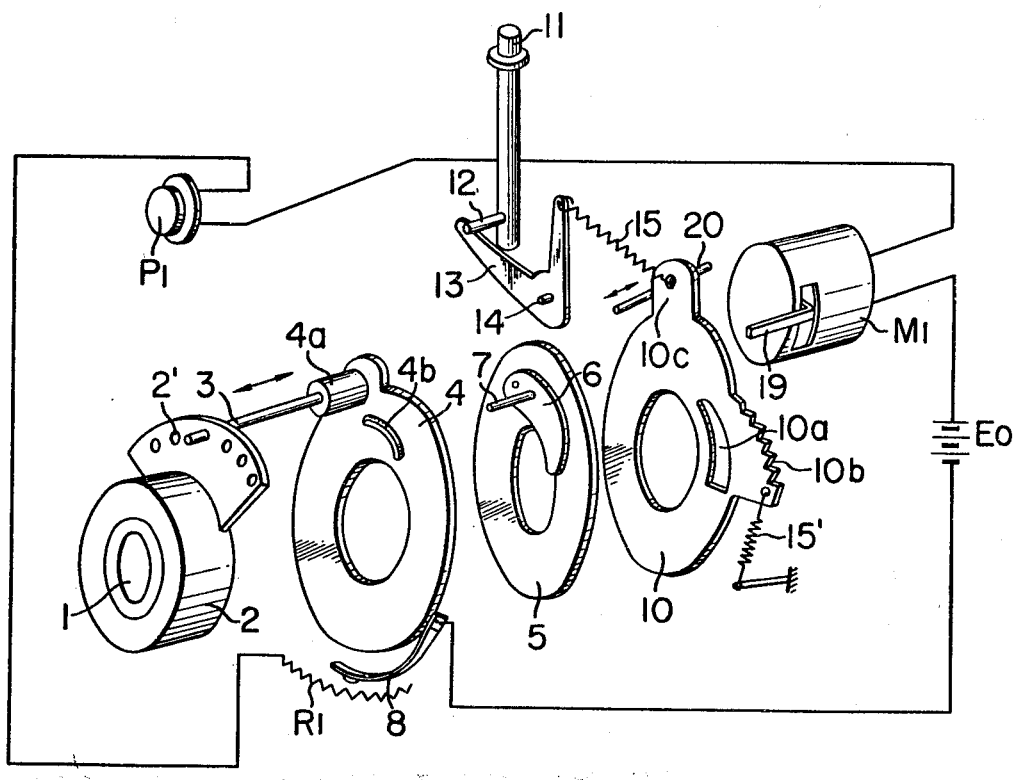
FIG. 1 is an exploded perspective view of a system embodying features of the invention.

FIG. 1 shows the essentials for controlling the iris and shutter of a camera to obtain a proper exposure either with an electronic flash or without flash. As shown in FIG. 1, the system is connected for flash operation.

In FIG. 1, an objective lens 1 is surrounded by a focusing ring 2 having a plurality of holes 2' selectively engageable with a connector pin 3. The hole 2' which the connector pin 3 engages corresponds to the guide number, i.e. the illuminating power, of a flash device (not shown in FIG. 1). A sleeve 4a projecting forward from the diaphragm ring 4 slidably supports the pin 3. The diaphragm ring 4 forms a spirally shaped cam groove 4b and moves relative to a fixed ring 5 that carries iris blades 6 of which one iris blade is shown.

A pin 7 mounted transverse to the iris blade 6 engages the cam groove 4b which corrects the aperture of the iris in response to the position of the focusing ring 2, and hence the focus setting, when the connector pin 3 engages any of the holes 2'. Thus the position of the focusing ring 2 imparts a movement to the ring 4 and hence the blades 6, which movement corrects the iris in response to the focus setting.

A slidable contact member 8 having one end fixed on the periphery of the diaphragm ring 4 forms the contact of a variable resistor $R_1$. Movement of the ring 4 by the focus setting 2 thus varies the resistance of the resistor $R_1$.

The variable resistor $R_1$ constitutes an electrical signal which varies the current in a photometer circuit composed of light receiving photovoltaic element $P_1$, the variable resistor $R_1$, a power source $E_0$ and a current meter $M_1$. The element $P_1$ is mounted in the camera and responds to light from the scene. The current passing through the meter $M_1$ is thus determined by the output of the element $P_1$ and the setting of the focusing ring 2 as manifested by the resistance of the variable resistor $R_1$.

The pointer 19 of the meter $M_1$ constitutes the output of the series photometer circuit. This pointer determines the shutter speed of the system in this embodiment. The shutter speed is established by a shutter ring 10. The speed is varied with any known means controlled by a cam hole 10a formed in the ring 10.

A shutter button 11 when depressed moves a pin 12 mounted thereon to rotate a bell crank 13 in a counter-clockwise direction around a pin 14 fixed on the camera. A bias spring 15 provided between one end of the bell crank 13 and a portion of the shutter 10, rotates the shutter ring 10 about the optical axis of the system against the force of a spring 15'. One end of the spring 15' is fixed to the shutter ring 10 and the other end of the ring 15' is fixed to a pin mounted on the camera. A saw-tooth step portion 10b engages the pointer 19 of the meter $M_1$ of the photometer circuit.

The particular step of the portion 10b which engages the pointer 19 is determined by the deflection of the pointer 19. Thus the rotational angle of the ring 10 is controlled in response to an amount of light from an object incident on the light receiving photovoltaic element $P_1$. A limiter pin 20 is moved longitudinally by pressure from the base of a flash device (not shown) when the flash device is fixed to the camera.

An electronic device with a gas discharge lamp (called a speed light device) may be incorporated into the system shown in FIG. 1, as well as in embodiments hereafter described if its size is sufficiently small.

During flash operation, the focus control ring adjusts the iris of the camera on the basis of the guide number, i.e. light power of the flash device. The shutter speed is made long enough to accommodate the comparatively short flash. For available-light (e.g. daylight) operation the pin 3 is decoupled from the focus ring 2 and the iris control adjusts the shutter speed through the resistance of the variable resistor $R_1$.

The system of FIG. 1 makes it possible automatically to obtain good photographs of the type that have hitherto been very difficult to obtain without a high degree of skill, with the use of an electronically operated gas discharge flash device. In embodiments such as shown in FIG. 1, both the time of the peak of the flash and the illumination period are short. A lens shutter makes it possible to energize the discharge tube in synchronism with the shutter even with a high shutter speed such as 1/500th or 1/1000th of a second is used. Therefore, when a flash photograph is taken the aperture of the iris of the camera responds to the focusing distance to the subject, i.e. the main object among all the objects being photographed, while, on the other hand, the photometric circuit which serves as an automatic exposure control device establishes the shutter speed to produce an average photometric exposure on the basis of the scene being photographed by the camera. The resistance of the variable resistor $R_1$ is controlled in response to the distance to the one object which is the main object among all the objects being photographed in the scene, i.e. the subject, and is connected into the photometric circuit. Thus the deflection angle responds to the brightness of the scene as well as the information entered into the information entered into the preset diaphragm aperture.

If the brightness of the subject, i.e. the the main object, differs from that of the background or remainder of the scene to be photographed, for example when the brightness of a back-lighted subject such as a person is comparatively lower than that of the background, the pointer 19 of the meter $M_1$ controls the shutter speed which affords an appropriate exposure with the preset aperture for the brightness of the overall scene. That is, the aperture formed by the iris blade 6 in FIG. 1 is set on the basis of the flash intensity and the focusing distance to the subject as well as to the film sensitivity. The light from the illuminated subject, i.e. at the main portion of the scene, exposes the corresponding portion of the film in response to this particular diaphragm aperture. On the other hand, since the deflection angle of the pointer 19 of the meter $M_1$ corresponds to the overall brightness, and mainly to the brightness of the background of the scene and accordingly adjusts the shutter speed to the overall scene, the shutter and diaphragm aperture are effectively adjusted to obtain an appropriate exposure for the illumination of the background.

In the device of FIG. 1 the limit pin actuates the aperture to correct the exposure produced by daylight and to prevent exposure times longer than particular values such as 1/30th of a second during flash photography.

Although the cam groove 4b of the diaphragm ring 4 is used for adjusting the iris on the basis of the focusing distance and film sensitivity or guide number correction, other modifications of the mechanism can be made for such values. The objective lens can utilize conventional construction.

For flash photography this embodiment merely requires the engagement of the connector pin 3 with one of the holes 2' of the focus ring 2 on the basis of the film used and the output of the electronic flash device. It also requires bringing the limiter pin 20 into the path of the projection 10c of the ring 10. Other special means are not needed. This permits photography synchronized with an electronic shutter with shutter openings that include back-light correction or side-light correction. It also permits appropriate exposures for both the main subject and the surrounding scene at night without blurring the surroundings. Conventional automatic exposures also become possible if the limiter pin 20 is disengaged from the ring 10 and the pin 3 disengaged from the focus ring 2.

The embodiment of FIG. 1 produces an appropriate exposure for the background. However, a slight overexposure within one F-stop results during daylight synchronized photography when the brightness of the main subject is rather high but less than that of the background. This happens because the aperture is set on the basis of the focusing distance of the main subject only.

Figure 2:
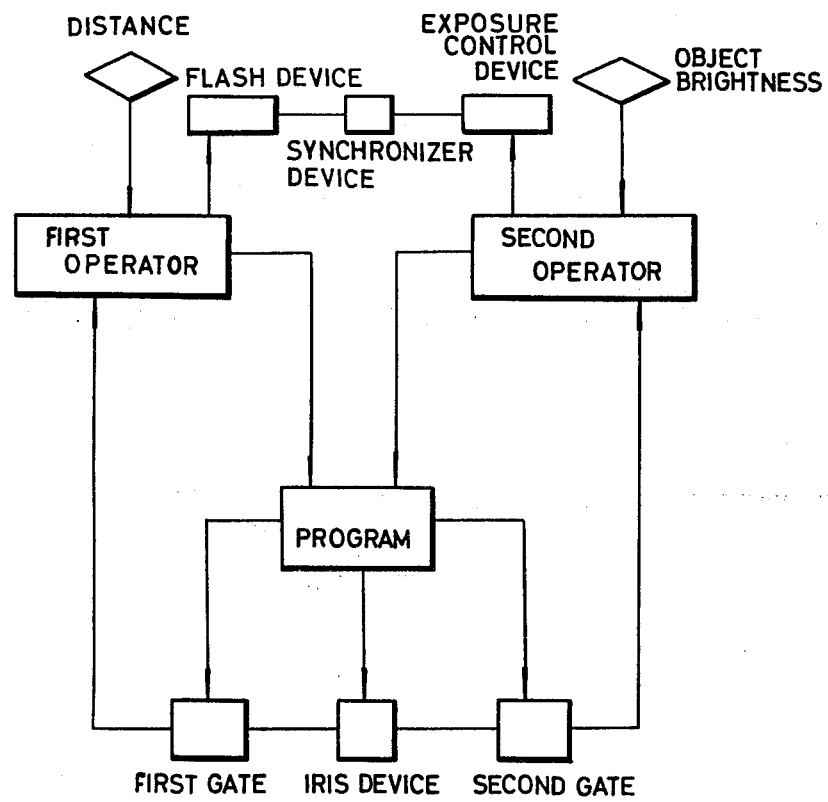
FIG. 2 is a block diagram illustrating the operation of the invention generally.

FIG. 2 is a block diagram generally illustrating the operation of the embodiments shown. Here, the exposure control system comprises a first setting means for a flash device which operates to determine at least the F number from a number of factors such as the guide number, the film sensitivity, the F stop, and the distance to be set. A second setting for the exposure control devices establishes at least the F stop of an iris from among a number of values such as the guide number, the film sensitivity, the F number and the distance to be set. A second setting means sets the exposure control device to determine at least the shutter speed from among a number of conditions such as the subject brightness, the film sensitivity, the square of the F stop and the shutter speed. A flash device is controlled by the first setting means. The exposure control device is controlled by the second setting means. A synchronizer synchronizes the flash device and the exposure control device. Effectively the iris is controlled by the first setting means and both setting means control the exposure control device. The program block in FIG. 2 is understood not always to be necessary. The first gate for the control of the flash is opened when an output from the second setting means is supplied thereto. A second gate for controlling the exposure control device is opened when the output from the first setting means is supplied thereto. Modification of the construction of the program and gates may provide flash-weighted photography or brightness-weighted photography.

FIGS. 3 to 6 illustrates embodiments in which overexposure of the main subject or object is prevented by detecting the brightness of the main subject as well as by setting the iris on the basis of the focus control.

Figure 3:
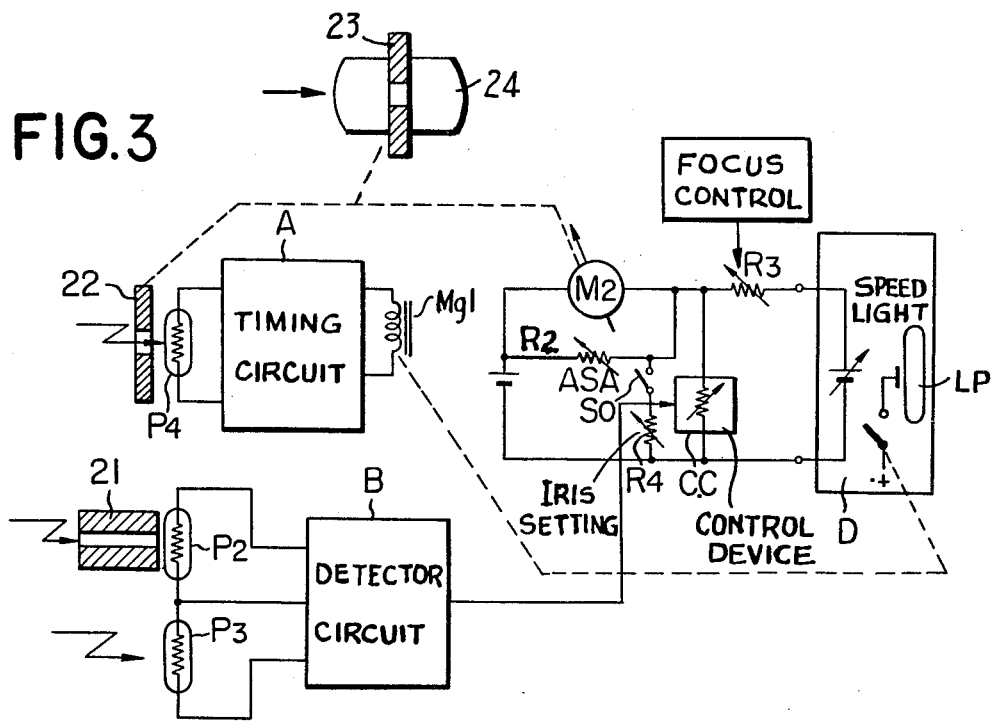
FIG. 3 is a schematic diagram illustrating a structure satisfying the need for exposure compensation and embodying features of the invention.
Figure 4:
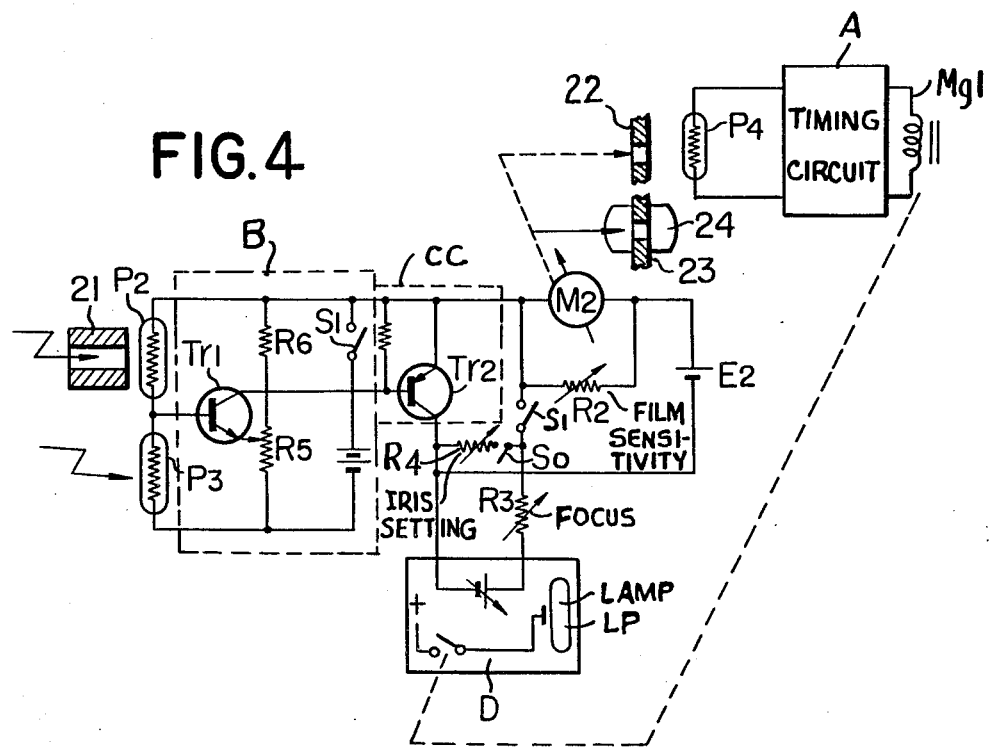
FIGS. 4, 5, and 6 are schematic diagrams illustrating modifications of the embodiment shown in FIG. 3 and embodying features of the invention.
Figure 5:
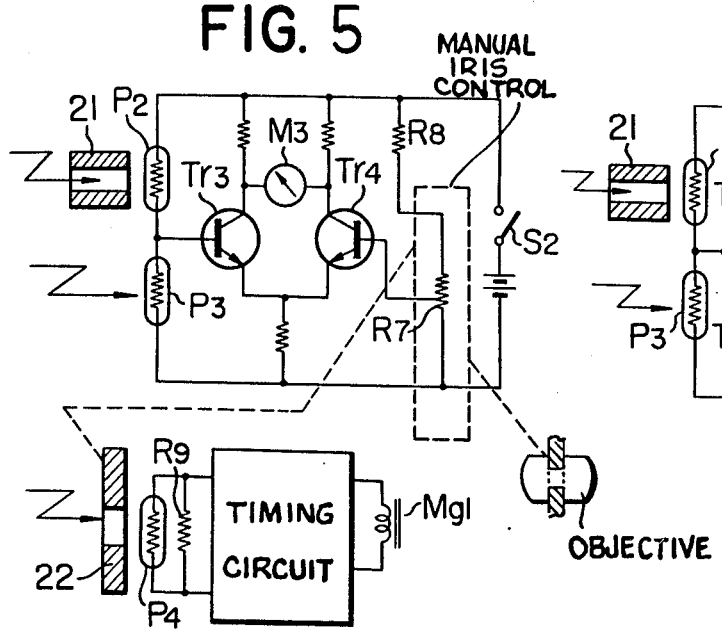
Figure 6:
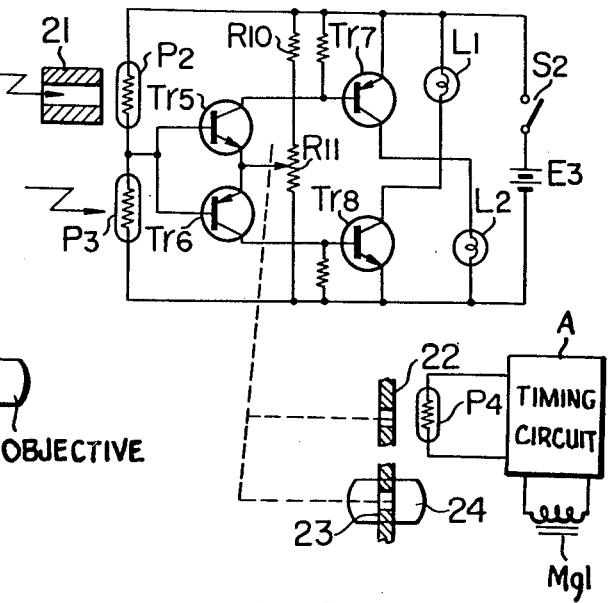

In general, as shown in FIGS. 3, 4, and 6, a circuit B compares the outputs of photoresistors $P_2$ and $P_3$ the first of which receives light, through an iris 21, only from the main subject while the latter receives light from the entire scene. A circuit CC responding to the comparison of circuit B controls current through a meter $M_2$ which in turn sets the iris 23 at the objective 24. A measuring iris 22 also set by the meter $M_2$ causes a timing circuit to open the shutter, synchronize a lamp LP in a flash device D, and actuate a relay Mg1 which closes the shutter. In FIG. 5 the irises are set manually in response to the motor $M_3$.

Figure 7:
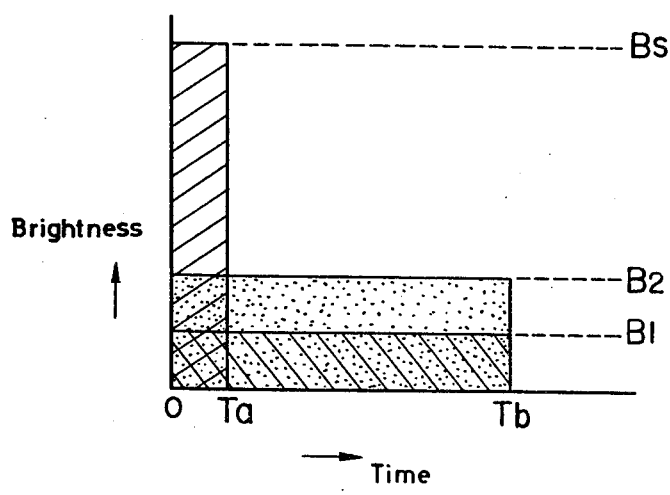
FIG. 7 is a graph illustrating the necessity of exposure compensation provided by various systems which embody features of the invention.

The aperture ratio to which the irises 22 and 23 are set is precisely the one which will cause the shutter to remain open just long enough to prevent slight overexposure due to a main subject slightly dimmer than a comparatively bright background. This will be most readily understood from consideration of FIG. 7.

If a flash device illuminates the main scene, the average brightness of the scene as a whole is Bs. The time during which the flash illuminates the main subject is Ta. The portion of the brightness of the main object which is contributed by the daylight is B1. The brightness of the remaining scene is B2. To equalize the exposure of the main subject with its surroundings or background, the following equation must be satisfied.

$$Bs\ Ta + B1\ Tb = B2\ Tb \therefore Tb = (Bs\ Ta/(B2-B1)$$

In these equations Tb is the total time of exposure. Bs Ta corresponds to the amount of light from a flash device over the flash time.

Meanwhile, for obtaining an appropriate exposure of the surroundings or remainder of the scene, the following relation must be satisfied.

$$Tb = (K/S) \times (F^2/B2)$$

Here K is a constant which takes into account such parameters as the transmittance of the objective lens and S is the film sensitivity, F the aperture ratio. From the previous equation, $$F = \sqrt{(S \cdot Bs \cdot Ta)/K} \times 1/\sqrt{1-(B1/B2)}$$

When B1 equals 0, F and Tb are respectively defined as Fo and To. Thus $$Fo = \sqrt{(S \cdot Bs \cdot Ta)/K} \text{ and } To = (Bs/B2)\ Ta$$

therefor $$F = Fo \times 1/\sqrt{1-(B1/B2)} \text{ and } Tb = To \times 1/1-(B1/B2)$$

if B1 equals $B2 \times 2^{-n}$,
where B1 is darker by n steps than B2, $$F = Fo \times (1/\sqrt{1-2^{-n}}) \text{ and } Tb = To \times (1/1-2^{-n})$$

As shown above, for obtaining an appropriate exposure, Fo and To are corrected after detection of the step difference n between the brightness of a central portion and the average brightness of the surrounding portion.

The following table illustrates the relationship between F and Tb.

Table 1

| n | F | | Tb | |
|---|---|---|---|---|
| 0 | $(\infty)$ | | $(\infty)$ | |
| 0.5 | $(\sqrt{2})^{1.77}$ | Fo | $2^{1.77}$ | To |
| 1 | $\sqrt{2}$ | Fo | 2 | To |
| 2 | $(\sqrt{2})^{0.42}$ | Fo | $2^{0.42}$ | To |
| 3 | $(\sqrt{2})^{0.19}$ | Fo | $2^{0.19}$ | To |
| 4 | $(\sqrt{2})^{0.09}$ | Fo | $2^{0.09}$ | To |
| 5 | $(\sqrt{2})^{0.05}$ | Fo | $2^{0.05}$ | To |
| $\infty$ | Fo | | To | |

In Table 1, F and Tb become Fo and To when $n = \infty$, i.e, B1=0.

For n=1, the iris is closed by one step and the exposure time increased by one step. When n=0 no difference exists between the brightness of the main object and that of the remainder. Thus there is no need to use a flash device. It is therefore impossible to obtain an appropriate exposure both for the main object and the remainder unless the aperture of the iris is substantially reduced and the exposure time is elongated over an extreme time period. This results in cancellation of the influence of the illuminating light incident upon the main subject. Where n=0, there is no practical difficulty because no attempt would be made to use flash photography. Limits can be indicated in the same manner as with conventional electric eye cameras with limitations in F stops up to about 22. The above refers to cases where the background or remainder do not reflect sufficient light from the flash to reach the camera. However, in such exceptional cases where the main subject is not near the camera and the background or remainder are not far from the main object, further correction of the values F and Tb is possible to obtain an appropriate exposure.

When the light receiving element for the scene as a whole responds quickly, the time Tb is determined by considering the light reflected by the background from the flash and the value of the main subject is influenced little by the product of $B1 \times Tb$. Therefore, it does not matter if the time Tb is decreased somewhat.

In FIGS. 3 to 6, the circuitry including portions B, CC, and $M_2$ set the irises 22 and 23 to the appropriate value on the basis of the relationship between B1 and B2. The timing circuit A then opens the shutter, triggers the flash, and then responds to the flash and available light arriving from the scene and passing through the iris 22, to close the shutter. The shutter time thus corresponds to the required time Tb.

In FIG. 3 the iris 21 limits the light receiving angle to a photosensitive element $P_2$. The iris 22 is placed in the path of light from the objective lens. That is, it is a through-the-lens iris. The iris 22 may also be placed at a position external to the objective lens. In that case it couples to the iris 23 in the path of light from the objective lens. The iris 22 is located before a photosensitive element $P_4$ of an electronic shutter device. The photosensitive element $P_2$, by virtue of its position behind the iris 21 receive light only from the central portion of a scene. A photosensitive element $P_3$ receives light from the scene as a whole. A timing circuit A operates the electronic shutter device. An electromagnet Mg1 controls the shutter blade of the electronic shutter device. A detector circuit B responds to the difference in brightness between the central portion of the scene and the remainder of the scene. When the camera is focused upon a main subject, the detector circuit B responds to the difference in brightness between the main subject and the background. A control device CC controls the current flowing through a current meter, such as a milliammeter $M_2$ in correspondence to the signal delivered thereto from the detector circuit B.

The meter $M_2$ with its pointer deflected by the current therethrough varies the apertures of the iris 22 and iris 23. Hence the current through the meter $M_2$ controls the light passing to the element $P_4$ as well as the light passing through an objective lens 24. The element $P_4$ may thus be said to operate as a quasi through-the-lens element. Two variable resistors $R_2$ and $R_3$ are set in accordance with photographic parameters such as film sensitivity and focusing distance. An electronic device, sometimes known as a speed light device, and using a gas discharge lamp LP includes an output terminal which produces an output indication of the guide number (i.e. light output power) of the device. The magnet Mg1 triggers the electronic flash device D in synchronism with the shutter opening.

According to an embodiment of the invention, the guide number may be variable. A variable resistor $R_4$ is interlocked with a diaphragm ring and a switch $S_o$ enters the resistor $R_4$ into the circuit. Details of some of the portions of FIG. 3 are shown in FIG. 4.

In operation, a diaphragm is pre-set to a value corresponding to the guide number of the flash device D. This may be done by a mechanical or electrical signal from the flash device D. The diaphragm may also be set manually. When the diaphragm is set manually, the switch $S_o$ is closed and the variable resistor $R_4$ is adjusted by rotation of the diaphragm ring. The photosensitive element $P_2$ detects the brightness of the main subject through the iris 21. This constitutes a spot measurement. The photosensitive element $P_3$ detects the brightness of the remainder or background of the scene and produces an average measurement. The detector circuit B enters both signals detected by the photosensitive elements $P_2$ and $P_3$ into the control circuit CC. The guide number may be transmitted mechanically on the basis of a notch fixed on the electronic flash by the manufacturer. It may be an electrical signal representing the pre-breakdown voltage across the flash lamp.

The signal from the control circuit CC, a guide number signal from the device D, and the setting of resistors $R_2$ and $R_3$ determine the indication of the meter $M_2$. The latter determines the setting of the irises 22 and 23. Thus the aperture of the iris is readjusted to an opening that compensates for the brightness difference between the main subject and the remainder or background.

The photosensitive element $P_4$ functions as a through-the-lens sensing element or as a quasi through-the-lens sensing element. When the shutter button is depressed at this stage, the photosensitive element $P_4$ measures or detects the amount of light both from the main object and from the remainder of the scene or background through the compensated opening of the iris 22 at its appropriate F number. At the same time the timing circuit A controls the exposure time of the electronic shutter device. This automatically produces an appropriate exposure.

The system of FIG. 2 may, according to an embodiment of the invention, be modified to produce an exposure, not on the basis of an aperture correction, but on the basis of a flash period correction. In this embodiment, with the system of FIG. 3 applied to a single lens reflex camera, a timer circuit corresponding to the timing circuit A is coupled to a switch-over switch corresponding to the switch-over switch $S_o$. The timer circuit includes a memory circuit with a variable element coupled to a variable resistor corresponding to the variable resistor $R_4$. A pre-set diaphragm is provided in the camera and photometering is achieved through a fully opened aperture of the pre-set diaphragm.

The system of FIG. 3 includes two photosensitive resistors $P_2$ and $P_3$ with three electrodes in all, and with one photosensitive resistor element $P_4$. According to an embodiment of the invention, the system of FIG. 3 is modified and the number of photosensitive elements is reduced. This is accomplished by providing a switch-over switch to two elements or only one element with three electrodes. Determination of the F number or aperture ratio as well as the correction thereof is achieved automatically or semi-automatically or manually as explained hereafter.

The embodiment of FIG. 3 is similar to that shown in FIG. 3. FIG. 4 shows the details of the components which make up the detector circuit B and the control circuit CC. In FIG. 4, the reference characters $P_2$ and $P_3$ designate photoresistors. A resistor $R_6$ serves as a bias resistor and a resistor $R_5$ serves as a potentiometer. The photoresistors and resistors $R_5$ and $R_6$ form a resistor bridge circuit. A detector transistor $Tr_1$ detects the voltage difference between the signal produced by the average measuring resistor $P_3$ and the signal produced by the spot measuring resistor $P_2$. A transistor $Tr_2$ forms the output circuit for the transistor $Tr_1$ and is connected parallel to a variable resistor $R_4$. A switch $S_o$ is closed only when the flash device D is used. A power source $E_2$ energizes the system for producing the first setting.

In operation, the transistor $Tr_1$ is biased so that it is not driven when correction is unnecessary. Such correction is unnecessary when the brightness difference between the principal subject and the background is large. Correspondingly the transistor $Tr_1$ is biased to be driven a particular amount when correction is needed due to the small difference in brightness between the main subject and the remainder of the scene.

The diaphragm ring is rotated so as to be pre-set to correspond to the guide number of the flash device D, the sensitivity of the film, and the focusing distance. The resistor $R_4$ is varied with the diaphragm ring. The current responding to the pre-set value passes through a meter $M_2$. The iris 23 of the objective lens 24 and the iris 22 of the photoresistor $P_4$ are controlled in response to the deflection of the meter pointer. The photoresistor $P_4$ is the one which controls the electronic shutter device. When the detector bridge delivers a correction signal, the detector transistor $Tr_1$ and the correction transistor $Tr_2$ become conductive. Thus the current through the meter is controlled with the aid of the transistor $Tr_2$ in response to the required amount of correction. When the flash device D with its signal terminal is combined with the embodiment of FIG. 4, it is possible automatically to correct the F number to correspond to the guide number of the flash device.

In this way, the meter $M_2$ responds to the brightness signal obtained by the spot measurement of the natural light or artificial light, for example indoor artificial light, reflected from the main subject with the aid of the photoresistor $P_2$. The meter also responds to the brightness signal obtained by the average measurement of the surroundings with the aid of photoresistor $P_3$ to provide an appropriate exposure.

When there is little or no difference in brightness between the main subject and the remainder of the scene, the transistor $Tr_2$ causes the meter $M_2$ to deflect its pointer over a large angle. The deflected pointer permits a warning signal to be generated and allows the shutter device to be locked. Conventional photography becomes possible by use of the switch $S_1$. For night photography, the resistance values of the resistors $P_2$ and $P_3$ are very high as compared to the resistances during daylight. Therefore the transistors $Tr_1$ and $Tr_2$ approach the non-conductive state. As a result the influence of the transistor $Tr_2$ becomes negligible and the camera is automatically set for night photography.

In the embodiment of FIG. 5, the F number correction is set manually. Photoresistors $P_2$ and $P_3$, a bias resistor $R_8$ and a potentiometer resistor $R_7$ interlocked with the diaphragm ring of the lens and iris 22, constitutes a detector bridge. A meter $M_3$ indicates deviation from an appropriate F number and its pointer deflects in a plus direction or a minus direction to indicate the degree and direction of the deviation. In this way, when the iris of the lens is varied, the potentiometer $R_7$ is varied with the change in the diaphragm. When the current through a transistor $Tr_3$ and the current through the transistor $Tr_4$ become equal, the deflection angle of the pointer is zero to indicate an appropriate correction of the diaphragm. A limiter resistor $R_9$ connected in parallel with the photoresistor $P_4$ for the shutter control limits the shutter speed within a range that prevents the shutter from producing blurs. The embodiment of FIG. 6 uses small indicating lamps $L_1$ and $L_2$ in lieu of the meter $M_3$ of the system in FIG. 5. This requires a slight modification of the circuit.

When the iris 23 of the lens 24 is corrected appropriately, the transistors $Tr_5$ and $Tr_6$ become nonconductive and the lamps $L_1$ and $L_2$ are not illuminated. A potentiometer resistor $R_{11}$ is varied with the diaphragm or iris 23. When the irises deviate from the appropriate condition, the transistors $Tr_5$ or $Tr_6$ become conductive. As a result, transistor $Tr_7$ or transistor $Tr_8$ becomes conductive to illuminate the lamp $L_2$ or $L_1$ respectively. The amount and direction of deviation from the appropriate aperture is thus indicated. The lamps $L_1$ or $L_2$ are also useful for giving warnings of deviation from appropriate diaphragm corrections.

In the embodiments shown in FIGS. 3 to 6, overexposure of the main subject is prevented by furnishing information from a detector that senses the brightness of the main subject as well as the F setting of the iris. This can be understood from FIG. 7 as previously explained.

The invention is also useful in cameras which combine the function of the iris with the function of the shutter. In such devices the shutter opens progressively at a constant speed and then snaps shut. If a longer exposure is needed the blades may open at the constant speed, reach their maximum possible opening, and remain at that opening, before snapping shut. In this manner the shutter blades perform the function of the shutter and the iris.

Figures 1, 8:
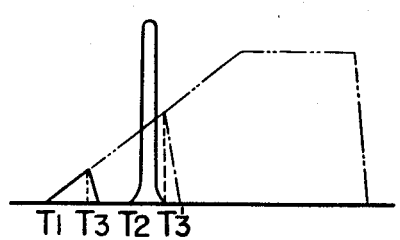
Figures 2, 8:
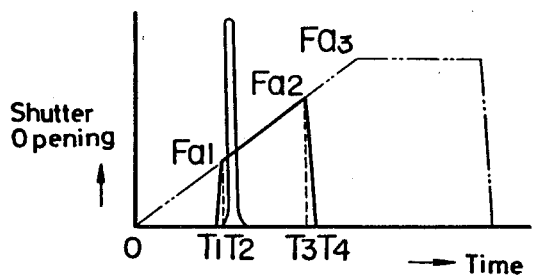
Figures 3, 8:
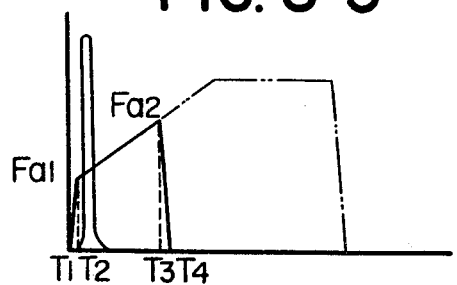
Figures 4, 8:
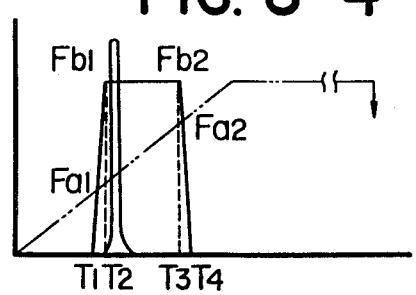
Figures 5, 8:
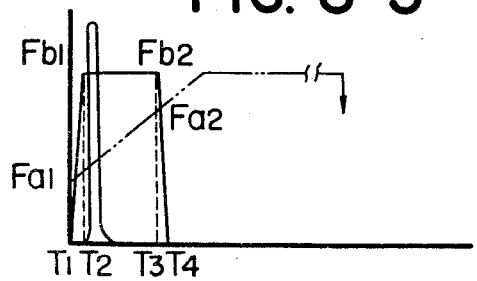

FIGS. 8-1 to 8-5 are graphs illustrating the changes in the shutter openings with respect to time for cameras utilizing such devices. These graphs relate to the embodiment of the invention shown in FIGS. 9, 10, 11, 12, 14 and 15, all of which illustrate improvements in the time control setting circuit and detector circuit making the invention applicable to cameras with such devices.

In FIGS. 8-1 to 8-5, the dash-dot-dot line represents the shutter opening characteristic when the shutter is allowed to open to its maximum opening and is then closed. Thus the shutter begins to open at the time $T_1$ and opens gradually beyond the time $T_3$, until it reaches a maximum opening represented by the horizontal line, whereafter the shutter closes. When an operator depresses the shutter button, and the shutter starts to open, it may follow the path shown by the solid line between the times $T_1$ and $T_3$. This occurs when the light responsive photoresistor which controls the shutter blades or blade is subjected to a rather large amount of light. Under these circumstances the shutter blade or blades tend to close the shutter at the time $T_3$ before a flash device can be triggered.

To eliminate this defect, the shutter blades are retarded until the opening reaches an appropriate value. At the time $T_2$, when an appropriate opening is nearly obtained, the flash tube is ignited. The shutter blades or blade are permitted to close only after the flash tube ignition and illumination is terminated. This occurs at the time $T_3$.

The straight solid lines in FIGS. 8-2 and 8-3 illustrate a modification of this type of shutter operation. Here the shutter blades or blade open quickly to a predetermined appropriate opening at the time $T_1$. This starts the exposure. Right after the time $T_1$ for the appropriate opening $Fa_1$, at the time $T_2$, the flash tube is triggered. After the time $T_2$, the opening continues to enlarge from a value $Fa_1$ to $Fa_2$ at a constant rate. At the time $T_3$ the shutter starts to close. It is completely closed at the time $T_4$. This produces an appropriate exposure. The time $T_3$ is determined by various factors such as the brightness of the surroundings or background, the constant speed of the shutter opening and the predetermined opening $Fa_1$. When the background or portion surrounding the main subject are dimly lit or are far from the main subject, the shutter blades open the shutter and keep it at its fully opened condition $Fa_3$ until an appropriate amount of light passes through the shutter.

Of course a limiter or limiter means may hasten the closure of the shutter blades or blade.

FIGS. 8-4 and 8-5 show operations similar to those of FIGS. 8-2 and 8-3. However, here the shutter and iris operate independently. As before, the iris opens progressively along the dash-dot-dot line. However, the independent shutter opens fully to the value $Fb_1$ between the times $T_1$ and $T_2$ and falls from a value $Fb_2$ equal to the value $Fb_1$ to 0 between the times $T_3$ and $T_4$.

In these cases opening of the iris blade which functions only as an iris contrasts to the cases shown in FIGS. 8-2 and 8-3 in which the iris blade performs the function of a shutter blade as well.

In FIGS. 8-4 and 8-5 the iris blade may be closed from its open state in response to retraction of the shutter release lever, movement of a film winding mechanism, or the like.

FIGS. 8-2 and 8-4 represent a camera in which the shutter button is pushed down at the time zero and a delay exists to the time $T_1$, to give the iris a chance to reach a value similar to $Fa_1$ as in FIG. 8-4, or to the time in which the iris would have reached a value just below $Fa_1$ and the blades are then released as in FIG. 8-2. This delay time between operation of the shutter release button and shutter operation creates the danger of losing a picture. The camera operations illustrated in 8-3 and 8-5 avoid this loss by starting the shutter operation immediately upon depression of the shutter release button.

FIGS. 9 to 12, 14 and 15, all illustrate shutter systems embodying the invention in which circuits control shutters which establish both the shutter speed and the objective diaphragm openings. These circuits control the initial diaphragm opening and the ultimate diaphragm opening as well as the shutter speed in response to spot measurements and average measurements as well as the focusing distance. Other data such as film speed and guide number are also entered. These circuits furnish the compensation desired for conditions such as a main object which is slightly dimmer than a bright background.

In FIGS. 9 and 10 the spot measurement and the focus setting controls the initial diaphragm opening. The average measurement regulates the ultimate opening as well as the shutter speed.

In FIG. 9, a photoresistor $P_2$ co-acts with a timer capacitor $C_1$ and a variable resistor $R_{12}$ set by the focus setting and the like to control the time and aperture at which an aperture setting shutter $F_s$ opens its blades or leaves. A photoresistor $P_4$ with three electrodes co-acts with a timer capacitor $C_2$ for controlling the time and ultimate aperture of the shutter $F_s$. A start switch $S_3$ normally short circuits the capacitor $C_1$ but starts operation of the time constant circuit composed of photoresistor $P_2$ and variable resistor $R_{12}$ as well as the capacitor $C_1$ when the switch $S_3$ is opened. A start switch $S_5$ normally shunting the capacitor $C_2$ also initiates operation of the time constant circuit composed of the elements $P_4$ and $C_2$. A differential amplifier $DA_1$ compares the voltage across the capacitor $C_2$ with the voltage established by a voltage dividing variable resistor $RN_1$ (set to the ASA film sensitivity) to control the time, and hence the aperture, at which the shutter $F_s$ opens. The mechanical operation of such a shutter is discussed with respect to FIG. 16. A differential amplifier $DA_2$ compares the voltage across the capacitor $C_2$ and the voltage established by a film-sensitivity-set voltage dividing variable resistor $RN_2$, which is ganged with the resistor $RN_1$, to control the time of closure, and hence the aperture at closure of the shutter FS. The resistor $RN_1$ serves for control of the flash device while the resistor $RN_2$ for the shutter.

An electromagnet $Mg_2$ responds to the differential amplifier $DA_1$ through a power transistor $PT_1$ for actually operating the shutter $F_s$, while an electromagnet $Mg_3$ responds to the amplifier $DA_2$ through a power transistor $PT_2$ and a coupling stage AT to actually close the shutter $F_s$. A power source $E_{45}$ supplies power to both of the timer circuits through a power switch $S_{46}$.

A switch $S_0$ is closed for conventional non-flash operation and open for flash operation.

A secondary switch $S_2$ is provided in parallel with the switch $S_0$ to prevent shutter closure before illumination of the discharge tube. Thus even if the switch $S_0$ is opened for flash operation, the secondary switch $S_2$ is closed to actuate the shutter exposure after flash illumination to prevent improper operation. The secondary switch $S_2$ represents a contact of the relay magnet $Mg_2$.

A limiter device 31 limits the angle of light impinging upon the photoresistor $P_2$ to the main object so that the output of the photoresistor $P_2$ represents a spot measurement. A diaphragm 32 varying with the blade or blades (or leaves) of the shutter $F_s$ limits the light impinging upon the photoresistor $P_4$. The output of the photoresistor $P_4$ thus represents a variable average measurement. The photoelement $P_4$ responds as if the measurement were made through the objective lens.

In operation, the main switch $S_{46}$ is first closed, either by the shutter release button or otherwise. The release button then releases an aperture control ring (FIG. 16-1) without opening the shutter blades of the shutter $F_s$, and closes the switch $S_3$. The latter allows the timer capacitor $C_1$ to charge up on the basis of the spot measurement performed by the photoresistor $P_2$ and the focus setting of the resistor $R_{12}$. The capacitor $C_1$ thus charges on the basis of the focus and on the basis of the brightness of the main object. The differential amplifier $DA_1$ actuates the shutter opening magnet $Mg_2$ on the basis of film sensitivity setting at the resistor $RN_1$ at a time $T_1$ in FIG. 8-2. This immediately opens the blades of the shutter $F_s$ as described particularly with respect to FIG. 16 and triggers the flash device D. It also closes the switch $S_2$ while opening the switch $S_5$. The overall scene illuminated by the flash device D and providing light for the photoresistor $P_4$ on the basis of the opening at the iris 32 (which corresponds to the opening of the shutter $F_s$) the capacitor $C_2$ begins to charge. When the capacitor $C_2$ reaches a charge value corresponding to that set in the resistor $RN_2$ (corresponding to film sensitivity), the magnet $Mg_3$ closes the shutter $F_s$. This occurs at the time $T_3$ in FIG. 8-2. Between the times $T_2$ and $T_3$, the shutter has been opening at a slower rate as shown in FIG. 8-2 and described with respect to FIGS. 16-1.

While the shutter $F_s$ was rapidly and then slowly opening, the iris 32 rapidly and then slowly opened. Thus the charging rate of the capacitor $C_2$ was a function of the light from the entire scene impinging upon the photoresistor $P_4$.

Of course, the reflected light from the background enters the resistor $P_4$ and the film in the camera especially when the background is close.

The construction of the system in FIG. 9 assures an appropriate exposure for the scene as a whole even when the intensity of light from the main object is low, or even when the intensity of light from the background is low.

The system in FIG. 10 corresponds to that of FIG. 9. Here the iris 31 is a limiting device for limiting the light receiving angle to the main object. Like reference characters designate parts similar to those in FIG. 9. In FIGS. 9 and 10 the resistor $R_{12}$ may be varied with information other than, or in addition to, the focusing distance, such as the guide number or film sensitivity. The circuits I and II correspond to the circuits $DA_1$ and $DA_2$.

The embodiment of FIG. 10 operates similar to that of FIG. 9.

The invention contemplates operating either of these embodiments in accordance with any of the graphs of FIGS. 8-1 to 8-5. In FIG. 10 as in FIG. 9, the trigger circuit I responds to the voltage across the timing capacitor $C_1$ reaching a predetermined value and energizes the electromagnet $Mg_2$ at the time $T_1$ in FIG. 8-2. This opens the blade or blades $F_s$ of the shutter to a predetermined value and the blades continue to open at a predetermined slower value. When the shutter blades $F_s$ are open, the flash device is triggered. An example of the shutter blade operation is discussed with respect to FIG. 16. The shutter blades $F_s$ also vary iris 32 and thereby subject the photoresistor $P_4$ to the light passing through the enlarging iris 32.

Operation of the electromagnet $Mg_2$ also opens the switch $S_5$. The switch $S_6$ may be closed by the electromagnet $Mg_2$ or may be closed beforehand to energize the second portion of the circuit.

Upon opening of the switch $S_5$, the capacitor $C_2$ begins to charge through the photoresistor $P_4$ on the basis of the light to which the latter is subjected. When the voltage of the timing capacitor $C_2$ reaches a predetermined value, a trigger circuit II energizes a shutter closing magnet $Mg_3$ which closes the blades $F_s$ of the shutter. This energization of the magnet $Mg_3$ occurs at the time $T_3$ in FIG. 8-2 and corresponds to the overall brightness including the background.

According to another embodiment of the invention the shutter blades $F_s$ cooperate with a separate between-the-lens iris coupled to the iris 32 and open to their full extent between times $T_1$ and $T_2$. According to another embodiment of the invention, this separate iris is the iris 32.

In the system of FIG. 10 the reflected light from the remaining portion also enters the resistor $P_4$ and strikes the film in the camera through the shutter when the remaining portions surrounding the main subject are located near the main subject.

The construction of the system as shown in FIG. 10 assures an appropriate exposure for the scene as a whole even in cases of low intensity from the main subject or even where the intensity from the remaining scene is low.

According to an embodiment FIG. 10 includes a flash coupled the same way as in FIG. 9.

Figure 11:
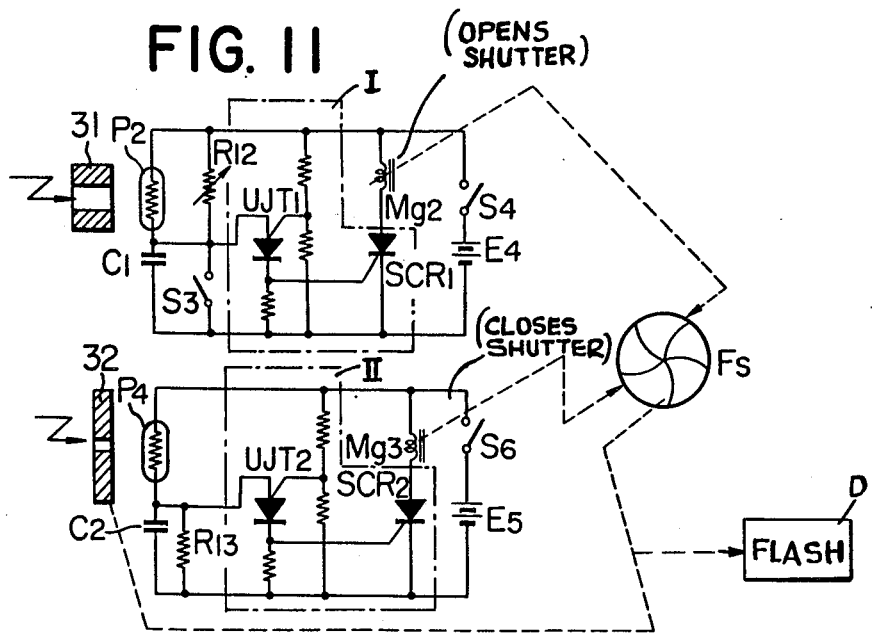

FIG. 11 shows details of the trigger circuits I and II including the associated photoresistors $P_2$ and $P_4$ and the timing capacitor $C_1$ and $C_2$ as well as the switches $S_3$ and $S_5$ and the resistor $R_{12}$. In FIG. 11, double base diodes or unijunction transistors $UJT_1$ and $UJT_2$ control silicon control rectifiers $SCR_1$ and $SCR_2$ which energize the magnets $Mg_1$ and $Mg_3$.

Figures 1, 16:
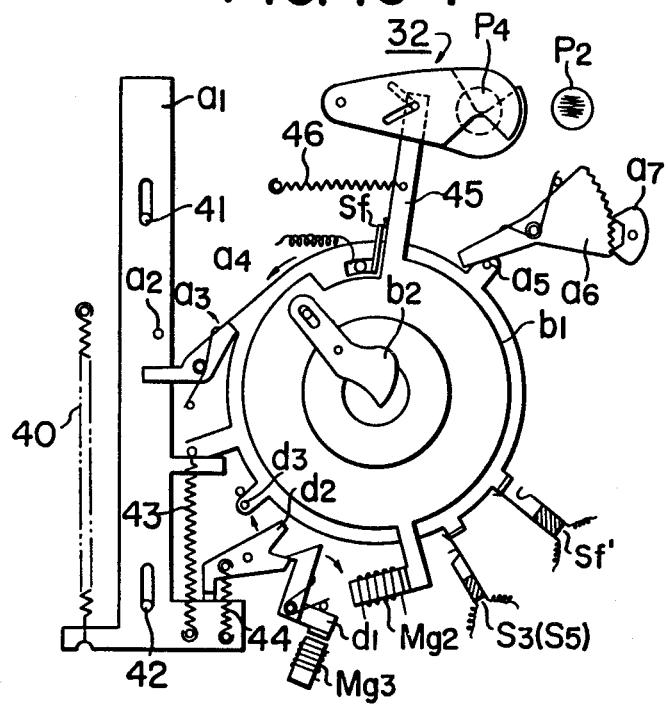
Figures 2, 16:
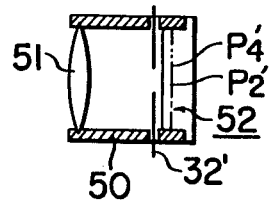

Many modifications of the circuit embodying features of the invention are contemplated with the use of transistors and the like. In contrast to FIG. 10, in the embodiment shown of FIG. 11, the switch $S_5$ is replaced by a combination of a resistor $R_{13}$ and iris 32. As shown in FIGS. 16-1 and 16-2, the iris 32 follows the blades $F_s$ throughout their cycle from open to close. Thus iris 32 does not expose the photoresistor $P_4$ until the blades $F_s$ open. A biasing resistor $R_{13}$ across the capacitor $C_2$ has a value much smaller than the photoresistor $P_4$ when the iris 32, acting as a substitute for the switch $S_5$ is closed and has a value much larger than the photoelement $P_4$ when the leaves of the iris 32 are open. Effectively the iris, which may have one or more leaves, causes the capacitor $C_2$ to be substantially discharged as long as it is closed.

In FIG. 12, the system again responds to both spot and average measurements and the iris operation is controlled by the focus setting during flash operation. A magnet $Mg_5$ controls both shutter opening and closures (FIG. 18) in response to pulses. Two switching elements $SL_1$ and $SL_2$ form high-speed relay contacts controlled by a magnet $Mg_4$. The element $SL_1$ is normally closed and the element $SL_2$ is normally open. Energization of the magnet $Mg_4$ opens the element $SL_1$ and closes the element $SL_2$.

Figure 12:
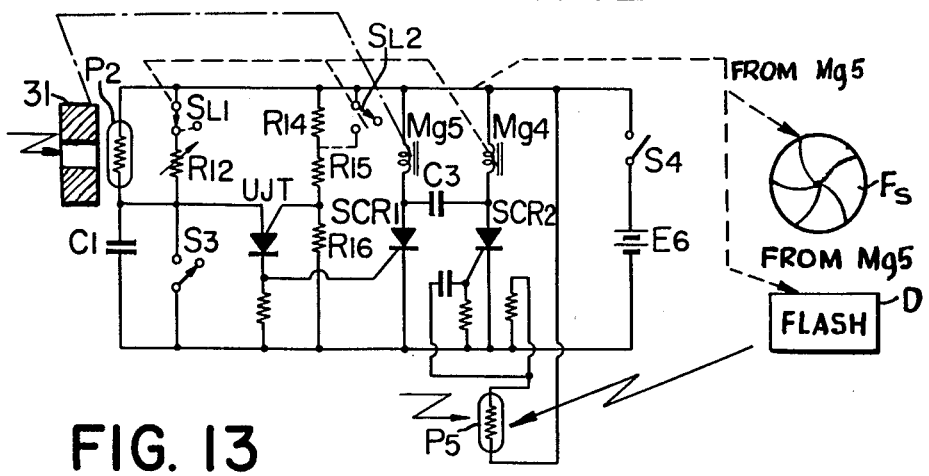
Figure 13:
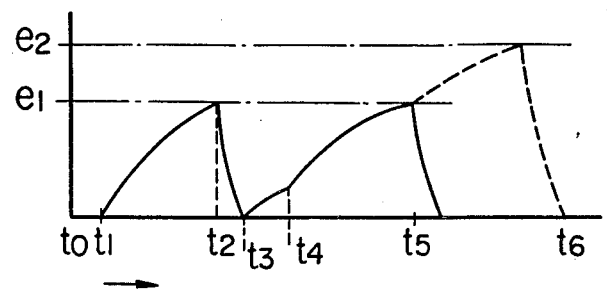
FIG. 13 is a graph illustrating the voltage across a timer capacitor of the embodiment shown in FIG. 12.

Operation of the circuit in FIG. 12 may best be understood by referring to the graph of FIG. 13. In FIG. 12 the iris 31 subjects the photoresistor $P_2$ to light essentially only from the main subject upon which the camera is focused. The focusing distance may be entered by varying the variable resistor $R_{12}$. Effectively the output of the photoresistor $P_2$ represents a spot measurement.

The main switch $S_4$ is closed at the time $t_0$ either when the shutter button is depressed or at an earlier time. Depression of the starter button opens the starter switch $S_3$ at the time $T_1$ so that the spot measurement permits charging of the capacitor $C_1$ through the resistors $P_2$ and $R_{12}$. As soon as the voltage across the capacitor reaches the value $e_1$ at the time $t_2$, as shown in FIG. 13, a programmable double base diode or unijunction transistor UJT is actuated to trigger a silicon controlled rectifier $SCR_1$. This discharges the capacitor $C_1$ between the times $t_2$ and $t_3$. When the silicon controlled rectifier $SCR_1$ is turned on by the output of the transistor UJT, the current flowing through the rectifier $SCR_1$ energizes the electromagnet $Mg_5$ which opens the shutter blade and ignites the gas discharge flash lamp.

Light directly from the flash tube enters a secondary photoelement or photoresistor $P_5$ which in turn ignites a second silicon controlled rectifier $SCR_2$. This extinguishes the silicon controlled rectifier $SCR_1$ through an inverter capacitor $C_3$. At the same time current flows through the magnet $Mg_4$ to open the element of switch $SL_1$ and to close the element $SL_2$. The system is now prepared for a second timer operation. In this second timer operation, the capacitor $C_1$ starts to charge through the resistor $P_2$ at the time $t_3$. It eventually reaches the values $e_2$ at the time $t_6$.

The resistors $P_2$ functions as if it is positioned behind the iris of the objective lens. The curve showing the shutter opening from the time $t_3$ to the time $t_6$, that is through the times $t_4$ and $t_5$, shows that the photo element $P_2$ is influenced by the opening of the iris which is positioned within the objective lens or which is associated with the iris within the objective lens. Thus, at the time $t_6$, the electromagnet $Mg_5$ is energized again to close the shutter blade.

In the above operation the contact $SL_2$ is connected across the resistor $R_{14}$ in series with the control for the unijunction transistor or double base diode UJT. If no means such as the contact element $SL_2$ is provided for changing the bias level of the double based diode UJT, the capacitor $C_1$ starts to charge at the time $t_3$. This charge takes place through the resistor $P_2$ to the value $e_1$ and ends at the time $t_5$. At this time the double base diode becomes conductive to turn on the silicon controlled rectifier $SCR_1$. This closes the shutter.

This system may be reset by releasing the shutter button or by operating a mechanism such as a film winding mechanism or the like. Meanwhile, for automatic electric eye operation without the use of flash, a slight modification is made in the mechanical construction of the circuit. In the latter case, turning off of the silicon controlled rectifier $SCR_1$ is accomplished by other means in addition to or instead of, the photoelement or photoresistor $P_5$.

Figure 14:
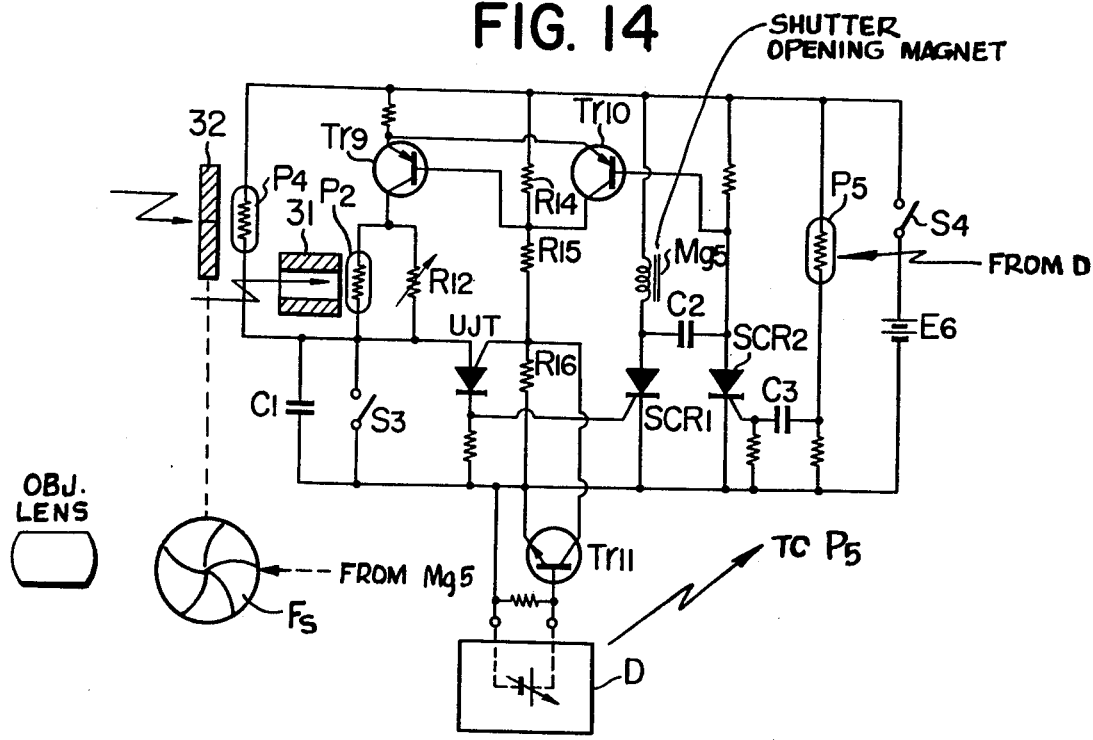
Figure 15:
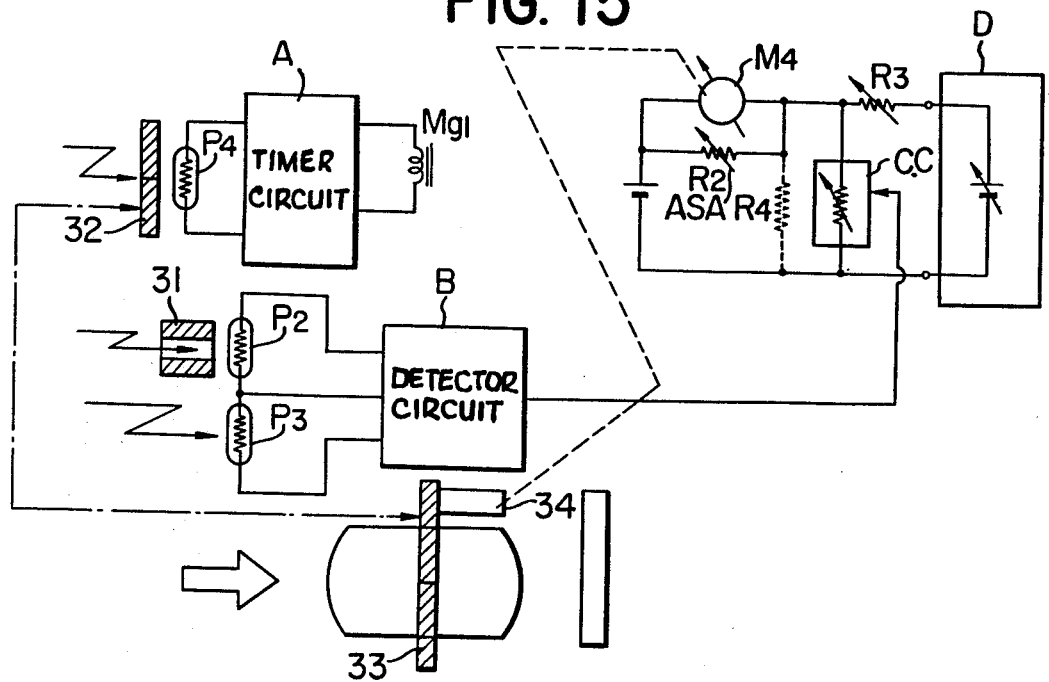

In the embodiment shown in FIG. 14, two photosensitive elements $P_2$ and $P_4$, one terminal of each being connected to the other are substituted for the photoelement $P_2$ shown in FIG. 12. Semiconductor switching transistors $Tr_9$ and $Tr_{10}$ replace the contact elements $SL_1$ and $SL_2$ of FIG. 12.

The system of FIG. 14 also responds to the focus setting and compensates for differences in the brightness of the main subject and the remainder of the scene.

In FIG. 14, transistors $Tr_9$ and $Tr_{10}$ form a Schmitt circuit or Schmitt trigger. The transistor $Tr_9$ is normally conductive while the transistor $Tr_{10}$ is nonconductive. This changes when the silicon controlled rectifier $SCR_2$ operates on its ignited state. However, when the diaphragm 32 which varies with the shutter between the objective lens is first closed, the resistor $P_4$ behind the diaphragm of the objective lens exhibits a resistance higher than the photoresistor $P_2$ that produces spot measurements.

Closing of the main switch $S_4$ and opening the starter switch $S_3$ causes charging of the capacitor $C_4$ to start. This charging takes place through the resistor $P_2$ and the variable resistor $R_{12}$ which is set to correspond to the focusing ring.

After the time $t_1$ (FIG. 13), the voltage across the capacitor $C_1$ reaches a value $e_1$. This renders the double base diode or unijunction transistor UJT conductive. This in turn ignites the silicon control rectifier $SCR_1$. Magnet Mg5 is now energized and opens the shutter blade or blades. The diaphragm 32 opens with the shutter blade.

Immediately after the time $t_2$, the electronic flash device D is triggered and illuminates the scene. In this way, the photoresistor $P_5$ receives light directly from the discharge tube of the device D and turns on the silicon control rectifier $SCR_2$. The ignited silicon control rectifier $SCR_2$ turns off the silicon controlled rectifier $SCR_1$ with the air of an inverter capacitor $C_2$. This renders the transistor $Tr_{10}$ conductive while the transistor $Tr_9$ is rendered nonconductive. This open state causes the photoresistor $P_2$ to be almost ineffective. As a result, the capacitor $C_1$ which was discharged by the transistor UJT starts to charge again through now-open photoresistor $P_4$.

De-energization of the rectifier $SCR_1$ de-energizes the electromagnet Mg5 and prepares the shutter operation. In this way, at the time $t_3$ when the voltage across the capacitor $C_1$ reaches the value $e_4$ the silicon control rectifier $SCR_1$ is turned on and the shutter blade is closed. The magnet Mg5 both opens and closes the shutter blades as described with respect to FIG. 18.

A transistor $Tr_{11}$ connected in parallel with the resistor $R_{16}$ corrects for the brightness difference between the main subject and the remainder. In this case, the transistor $Tr_{11}$ varies the bias level for the transistor UJT.

Thus, because controlling the transistor $TR_{11}$ adjusts the voltage at the time of the start of discharge through the transistor UJT, the time $t_2$ for synchronous illumination may be selected easily to correspond to the degree of opening of the iris blade. As a result, an appropriate exposure for the main object is obtained. Because the signal from the electronic flash device is applied to the base of the transistor $Tr_{11}$, the aperture correction is attained automatically in correspondence to the light intensity of the discharge tube or the guide number as well as the focus setting.

The system in FIG. 5 is similar to that of FIG. 14. Here an ammeter $M_4$ determines the F number. The deflection of the needle in the ammeter $M_4$ controls a stopper 34 of the diaphragm 33 and the diaphragm 32 which operates as a through-the-lens diaphragm. With the aid of spot measuring photoresistor or photoelement $P_2$ and average measuring photoresistor or photoelement $P_3$, the detector circuit B emits a correction signal corresponding to a backlight condition. This correction signal arrives at a controller circuit CC to control the circuit of the meter. This produces the proper F number for flash exposure. In this state, immediately after the shutter button is depressed, the shutter opens quickly. Thus this embodiment performs the operation illustrated by the graphs of FIGS. 8-3 or 8-4. The F number may be pre-set by a variable resistor $R_4$ or the like. The latter is associated with the diaphragm ring or may be automatically pre-set by a signal from the electronic flash D.

The mechanical structure of a shutter such as $F_s$ of FIG. 10 is shown in FIG. 16-1. The operation of the shutter corresponds to that in FIG. 8-2. See FIG. 16-1.

When a release lever a1 is pressed down against the force of a biasing spring 40, a pair of pins 41 and 42 engaging pin slots guide the release lever. This operation energizes a tensile spring 43 which biases a stopper ring a4. It also energizes a return back-spring 44.

Pressing the release lever a1 further down causes a pin a2 on the lever a1 to rotate a locking lever a3 in the counterclockwise direction. This frees the stopper ring a4 and allows it to rotate in the counterclockwise direction. A governor composed of an anchor a7 and a sector gear a6 driven by a pin a5 which is mounted on the rotating ring a4 maintains the speed of rotation of the stopper ring a4 constant by imposing a braking action upon the pin a5. Slight rotation of the stopper ring a4 opens a switch $S_3$ and allows the secondary switch Sf' to close. In this way, the shutter operates with the aid of the circuit in FIGS. 9 and 10 or with the aid of a circuit similar to the one in FIGS. 9 or 10.

At the time $T_1$, after the stopper ring a4 starts to rotate, a magnet Mg2 which holds back a blade ring b1, is de-energized and frees the blade ring b1. This allows a spring 46 to rotate the blade ring b1 until a projecting lever 45 contacts the synchronizer contact Sf. The latter is mounted on the stopper ring a4 by suitable electrical insulating means and is connected in series with the synchronizer contact or switch Sf'. This quickly opens an iris blade b2 to an aperture opening Fa1. The opening of a diaphragm 32 for the photoelement $P_4$ corresponds to that of Fa1.

Just when the contact Sf contacts the lever 45, the discharge tube is triggered through the previously closed switch Sf'. This furnishes flash illumination at the opening Fa1. Thereafter the blade ring b1 continues to rotate along with the stopper ring a4 at a speed determined by the governor composed of members a6 and a7. Thus, the blade b2 continues to open progressively at a constant speed.

energization Energization a magnet Mg3 at a time $T_4$ by a suitable circuit rotates the lock pawl d1 clockwise. This frees a shutter closing intermediate lever d2.

A strong return spring 44 drives the lever d2 in the counterclockwise direction against a pin d3 on the stopper ring a4 so as to drive the stopper ring rapidly in the clockwise direction. The governor composed of members a6 and a7 has no braking effect upon this closing movement of the stopper ring a4.

When the release lever a1 is freed, a spring biases the sector gear a6 in the counterclockwise direction to return the governor to its initial position. Release of the lever a1 also opens the secondary synchronizer Sf' which is connected in series with the synchronizer Sf and closes the starter switch $S_3$. The upward movement of the lever a1 causes the pin d3 to rotate the lock lever d2 in the clockwise direction until the latter passes over the slope of the lock pawl d1 and is locked by the lock pall d1. In this state, although the synchronizer switch Sf is closed, the secondary synchronizer switch Sf' is open and thereby eliminates the danger of actuation of the flash device.

FIG. 16-2 illustrates a modification of the portion of the apparatus in FIG. 16-1 involving the diaphragm 32 which is driven by the blade ring b1. A CdS photoresistor 52 of complex structure is incorporated as part of a unit including a control portion p2' and another portion p4'. A holder 50 holds a lens 51 and the photoresistor 52. A diaphragm 32' corresponds to the diaphragm 32 of FIG. 16-1. The control portion p2' of the photoresistor 52 is positioned in the focal plane of the lens 51 and receives only light from the main subject being photographed. A diaphragm 32' corresponding to the diaphragm 32 blocks out the remainder of the scene. The other portion p4' of the photoresistor 52 receives the light from the remainder of the scene when the diaphragm 32' is opened further. When the light receiving portion is constructed as shown in FIG. 16-2, it is possible to make the size of the cam very compact. If the portion p4' is perfectly shielded, the switch $S_5$ may effectively be omitted as shown in FIG. 11.

Now in FIG. 11, assuming the photoresistor 52 performs the function of the photoresistor $P_2$ as a whole, the resistor $P_2$ first performs a spot measurement. During the exposure the resistor $P_2$ performs an average measurement of the through-the-lens type.

Figure 17:
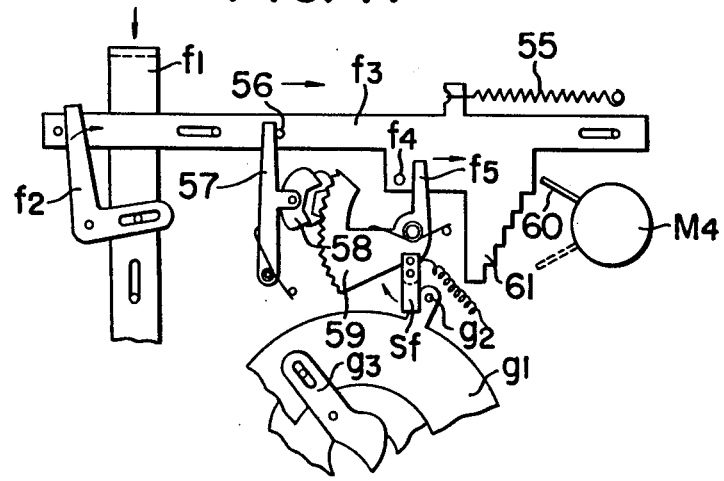
FIGS. 17 and 18 are structural drawings illustrating other embodiments of the invention.

The mechanical construction illustrated in FIG. 17 corresponds to the operation shown in FIG. 8-2. In FIG. 17, a release lever $f_1$, when depressed rotates an intermediate lever $f_2$ in the clockwise direction. This permits a spring 55 to pull a cam lever, having a step cam 61, to the right. A lever 57 carries an escapement anchor 58 which engages a sector gear that carries a synchronizing switch Sf. A blade ring $g_1$ carries a pin $g_2$ which contacts the synchronizing switch Sf. The blade ring $g_1$ articulates a blade $g_3$.

When the release $f_1$ is depressed, the cam lever $f_3$ positioned as shown in FIG. 17 with the aid of a return spring 40 (not shown in FIG. 17) is drawn to the right by the spring 55. This causes the pin 56 on the lever $f_3$ to release the lever 57 so that the escapement anchor 58 can engage the sector gear 59. When a pointer 60 of a current measuring meter $M_4$ is deflected to the position shown in FIG. 17, the step on the cam 61 immediately obstructs movement of the lever $f_3$. The lever $f_3$ thus is forced to stop at a position where one end $F_5$ of the escapement sector gear 59 is touched by a pin $f_4$ mounted on the lever $f_3$.

When the pointer assumes the position indicated by the dotted lines in FIG. 17, the cam lever $f_3$ can move further to the right. This further movement of the cam lever $f_3$ causes the pin $f_4$ to rotate the sector gear 59 while it is loaded by the escapement anchor 58 until the cam 61 touches the pointer 60 of the meter $M_4$.

Thus when the release lever $f_1$ is pressed down further, suitable means, not shown in FIG. 17, release the blade ring $g_1$ until the pin $g_2$ contacts the switch Sf which serves as a stopper. Thus the blade $g_3$ opens instantaneously to the opening Fa1 which corresponds to the deflection angle of the pointer 60 of the meter $M_4$, that is up to the stopped position of the switch Sf. The blade $g_3$ rotates into an open position at a constant speed under the control of the escapement anchor 58 and the sector gear 58 and driven by the ring $g_1$ after the discharge tube is triggered to illuminate the scene at the opening Fa1. The exposure is complete at the time $T_4$. If the release lever is permitted to return back after completion of the exposure, the escapement anchor 58 is disengaged from the gear 59 and allows the gear quickly to return to its starting position so as to permit the next shutter release operation immediately. The escapement anchor 58 engages the sector gear 59 before the sector gear is set to correspond to the deflection angle of the pointer 60 of the meter 4. However, the escapement anchor 58 may be engaged with the sector gear 59 after the sector gear position has been set by the meter $M_4$.

Figure 18:
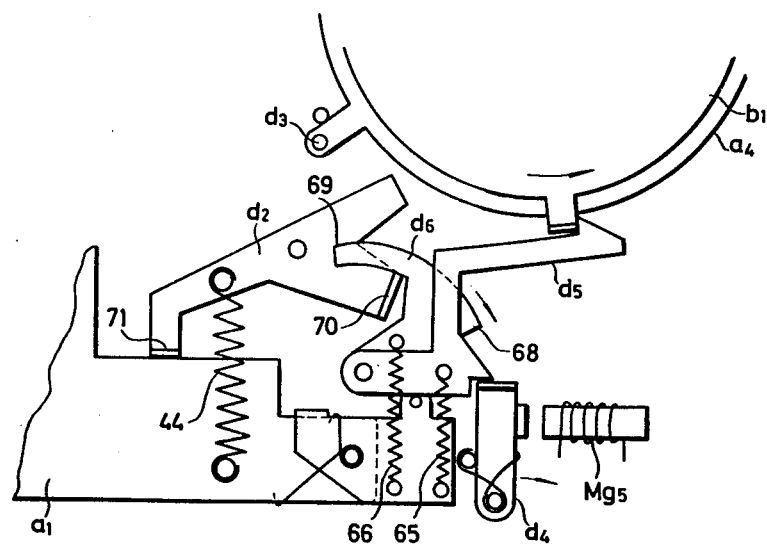

An example of the mechanical apparatus using only one magnet Mg5 to control the shutter opening and shutter closure and suitable for operation with the circuits of FIG. 12 and FIG. 14 is illustrated in part of FIG. 18. Here, an electromagnet Mg5 attracts a lever d4. A lever d5 uses its end to engage a blade ring b1 and also engages the upper portion of the lever d4. A lever d6 engages the bent projection 70 of a lever d2 and also engages the lever d4.

When a release lever a1 is depressed, and when a first current pulse passes through the electromagnet Mg5, the lever d4 rotates in the clockwise direction. This frees the lever d5 and a spring 65 rotates the lever d5 in a clockwise direction and permits rotational motion of the blade ring b1. This starts the exposure. In this way, immediately after the magnet Mg5 is de-energized, the spring surrounding the lever d4 rotates the latter in the counterclockwise direction. Thus the stepped portion 68 which a spring 66 has rotated slightly in the clockwise direction is stopped by the lever d4.

When a second pulse energizes the magnet Mg5, the latter again attracts the lever d4 and rotates it in the clockwise direction. This frees the stepped portion 68 of the lever d6 so that th latter can pass downwardly beyond the top of the lever d4. This disengages the end 69 of the lever d6 from the bent projection 70 on the lever d2 and allows the spring 44 to move the lever d2 counterclockwise. This motion forces a pin d3 on a stop ring a4 to rotate the stop ring very quickly in the clockwise direction and thus complete the exposure. After the exposure is completed, and when the release lever a1 is returned to its initial position, the end 69 of the lever d6 is at first restricted by the bent projection 70 of the lever d2. However, when the release lever a1 returns a bent projection 71 of the lever d2 back up to a position shown in FIG. 18, the lever d6 returns up to the position shown in FIG. 18. Thus the mechanism is reset for the next shutter operation.

Figure 21:
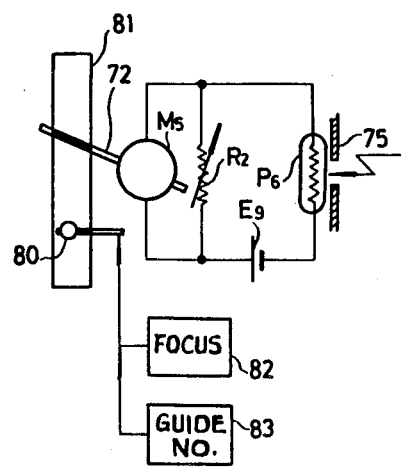
FIGS. 20 and 21 illustrate other embodiments of the invention.
Figure 19:
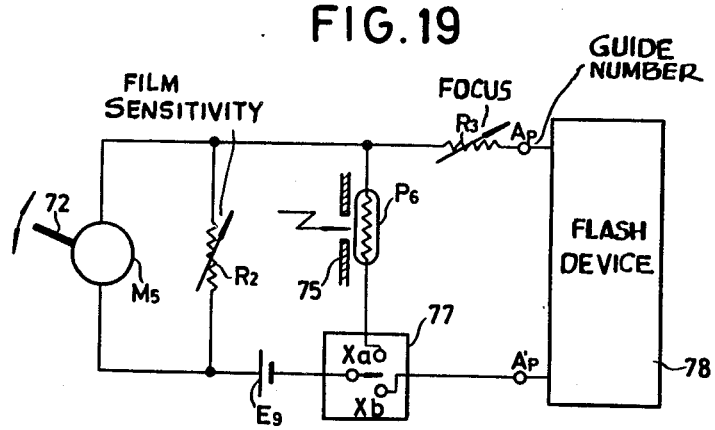
FIG. 19 is a view showing an embodiment of the invention in which an iris is controlled in response to a preset shutter speed.
Figure 20:
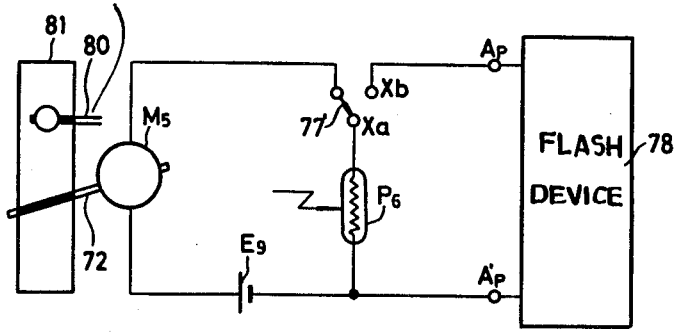

The embodiments of FIGS. 19–21 conform various operating values to permit simple flash photography in daylight even by a beginner.

In FIG. 19 an automatic electric exposure mechanism (EE) operates an iris in response to a present shutter speed. Here, a pointer 72 of a current measuring meter $M_5$ in a photometric circuit is coupled with an iris control through a conventional saw tooth cam arrangement such as shown in the embodiment of FIG. 17. A variable resistor $R_2$ responds to the film sensitivity or similar photograph information. A diaphragm 75 coupled to a shutter speed setting mechanism adjusts the amount of light impinging on a photoelement $P_6$. A variable resistor $R_3$ is coupled to vary with the focusing ring or other mechanism that establishes the distance between the subject and the camera, during flash photography. A changeover switch 77 contacts a terminal Xa during automatic daylight operation (AUTO) and a terminal Xb for flash operation (FLASH).

The switch 77 may be in the form of an electric or electronic chopper or a mechanical chopper, or the like. A flash device 78 applies a control signal corresponding to the guide number thereof through connector terminals Ap and Ap' to the photometric circuit generally shown in FIG. 19. A power source $E_9$ energizes the circuit.

For conventional automatic electronic exposure operation, the switch 77 is moved to the terminal Xa and the variable resistor $R_2$ varied in response to the film sensitivity. An operator sets the aperture of the diaphragm 75 to a selected shutter speed so as to expose the photoelement $P_6$ to particular light signals. The element $P_6$ performs an average measurement of the overall scene and thus generates a signal embracing the background. It thus is useful when the brightness of the subject i.e. main object, and the background (i.e. remainder) differ, such as when the subject is backlighted. The deflection angle of the pointer 72 of the meter 5 indicates an appropriate F number (aperture ratio) during such conventional automatic exposure photography.

For flash photography during the daytime, the switch 77 is turned to the position Xb and the variable resistor $R_3$ adjusted with the focusing ring to a value corresponding to the distance to the subject being photographed. In this way, a control signal corresponding to the guide number of the variable-illumination electronic flash apparatus (speed light device) 78 deflects the pointer 72 of the member $M_5$ to a given position. For obtaining an appropriate exposure with a flash synchronized with the shutter, the meter 72 must be brought to a position corresponding to that which would have been the case where the switch turned to the Xa position. This may, for example, be achieved by changing the shutter speed control.

To obtain an appropriate aperture or F number easily during flash operation, it is convenient to make the pointer 72 stop when the outputs occurring during the positions Xa and Xb align with each other and to make the pointer vibrate during misalignment. The switch 77 may be in the form of a chopper to periodically switch between the positions Xa and Xb to accomplish this. Similar results are obtained by periodical repetition of the opening and closing of the diaphragm mechanism 75 in order to vary the amount of light incident upon the photoelement $P_6$.

In operation, the variable resistor $R_3$ of FIG. 19 is adjusted on the basis of the focusing distance to the subject, i.e. main object. When the movable contact of the changeover switch 77 is connected with the terminl Xb, a voltage signal proportional to the amount of light from the flash device 78 flows through the variable resistor $R_3$, the ammeter $M_5$, the battery $E_9$, and the changeover switch 77. Thus the pointer 72 of the meter $M_5$ is deflected to a given position.

The photoelement $P_6$ varies its resistances on the basis of an average reading which mainly involves the brightness of the background of the scene being photographed. Thus the pointer 72 of the meter $M_5$ moves to a deflection angle proportional to the brightness of the background when the switch cuts over to the terminal $X_a$. If the deflection angle of the pointer 72 when the switch 77 contacts the terminal $X_a$ differs from the deflection angle when the switch 77 contacts the terminal Xb, the pointer 72 of the meter $M_5$ vibrates with the movement of the armature of the switch 77. This causes an operator to turn the shutter speed controlling dial shown in FIG. 1 to stop vibration of the pointer 72 and to adjust the aperture of the diaphragm. Along with the variable shutter speed the light incident upon the photoelement $P_6$ becomes variable and causes stepwise variation of the resistance value of the photoelement $P_6$. As a result, the pointer 72 of the meter $M_5$ makes the shutter speed controlling dial variable similar to the deflection when the changeover switch 77 contacts the terminal Xb.

The diaphragm value defined by the deflection angle of the pointer 72 of the meter $M_5$ at the rest condition is set to the diameter of the aperture which affords an appropriate exposure of the main object to be photographed. The variable resistor $R_3$ enters the focusing distance to the main object into the diaphragm aperture. The latter is also dependent upon the guide number of the flash device. The shutter speed is set to a value affording an appropriate daylight exposure of the background and is associated with the preset diameter of the diaphragm aperture.

Subsequently, when a shutter release button, not shown, is depressed, the shutter is opened and the flash device 78 illuminated. Illumination of the flash device exposes the subject, i.e. the main object, with light from the flash while the background is exposed for a period of time that elapses between opening and closing of the shutter on the basis of the brightness produced by daylight or available light.

Upon illumination of the flash device 78, the background of the scene is illuminated by part of the flash. However, when the subject is positioned far from the background, illumination by the flash will be ineffective. In this case, the shutter speed is set by the variable resistor $R_2$ or the like.

FIG. 20 illustrates a modified circuit for an automatic exposure electric eye camera. Here the pointer 72 of the meter $M_5$ and a reference pointer are aligned with each other to obtain an appropriate exposure. This system is particularly suitable for the cameras with focal plane shutters.

In FIG. 20, a reference pointer 80 is coupled to a diaphragm mechanism that controls the diaphragm and is moved with the diaphragm. The pointer 80 moves within an indicator window provided in a finder. Elements corresponding to those of FIG. 19 carry the same reference numerals in FIG. 20.

When Flash-Auto switch 77' is moved to contact the terminal Xa, the light detected by the photoresistor or photoelement $P_6$ causes the pointer 72 in the meter $M_5$ to deflect in dependence upon the amount of light. Adjustment of the diaphragm mechanism aligns the reference pointer 80 with the pointer 72. Thereafter, the switchover switch or throw-switch 77' is shifted to the contact Xb. Adjusting the guide number of the flash device 78 aligns the pointer 72 of the meter $M_5$ with the previously set reference pointer so as to obtain an appropriate exposure. Thus, the reference pointer 80 is first aligned with the pointer 72 when the switch 77' is in the position Xa, and the pointer 72 is then aligned with the previously aligned reference pointer when the switch 77' is in the position Xb.

FIG. 21 shows another example of a camera with a reference pointer. Here, the meter 5 operates continuously. The pointer 72 of the meter $M_5$ always responds to the amount of light impinging upon the photosensitive element $P_6$. The reference pointer 80 is coupled with the focusing mechanism 82 and the guide number adjuster 83 of the flash device 78. Thus the reference pointer 80 is dependent at least in part on the distance to the subject being photographed.

When the focusing distance is adjusted to an object after setting of the guide number and film sensitivity, the reference pointer appears through the indicator window. Then, changing the shutter speed and arrangement of the diaphragm mechanism 75 provided at the front of the photoelement $P_6$ aligns the pointer 72 of the meter $M_5$ with the reference pointer to obtain an appropriate flash exposure.

The aforementioned embodiments concern photographing of back-lighted subjects where the subject is dimmer than the background. The present invention is not applicable for the reverse case when the subject is brighter than the background where it is necessary to leave the distance between the subject and the background to be able to disregard the effect of illumination from the flash light.

While specific embodiments of the invention have been shown and described in detail to illustrate the application of the inventive principles, it will be understood that the invention may be embodied otherwise without departing from such such principles.

What is claimed is:

1. An exposure control system for a scene having a main portion and a remaining portion, comprising
   (A) flash illumination means for emitting an auxiliary light to illuminate at least a main portion of a scene to be photographed;
   (B) exposure control means including
      (b1) exposure aperture means adjustable to an aperture for obtaining an appropriate flash exposure in response to the distance to the main portion, said exposure control means including
      (b2) shutter means for providing an exposure for a variable time and for actuating said flash illumination means on a synchronous basis;
   (C) control circuit having
      (c1) a light receiving element for generating an electrical signal in response to an amount of light from substantially the remaining portion of the scene and
      (c2) time defining means for determining the time of said shutter means on the basis of the output of said element and the adjusted aperture value so as to produce an appropriate exposure for substantially the remaining portion of the scene; and
   (D) limiter means for preventing the shutter from being adjusted beyond a predetermined time.

2. An exposure control system as in claim 1, wherein said control circuit means further comprises a meter which is connected with said light receiving element, a variable resistor, said meter having an indicating pointer, said time defining means including detecting means responsive to the pointer for detecting the position of the pointer and adjusting means coupled to said detecting means for adjustably operating said shutter means in response to the deflection angle of said pointer.

3. An exposure control system for a camera for affording an appropriate overall exposure when an object is illuminated with a flash, comprising: flash illumination means, a focusing device for a photographing lens, exposure control means having aperture adjusting means for adjusting the aperture diameter, shutter means synchronized with said flash illumination means for exposing a film through said exposure aperture means, control circuit means having a photoelectric conversion element for measuring the overall brightness and converting it into a quantity of electricity, an electromagnetic member displaceable over a movable range in response to a quantity of electricity being applied and adjustably determining the shutter opening of said shutter means as well as the opening of exposure aperture means respectively in response to an amount of displacement of said member, control means having a reference member which is displaceable within the movable range of the electromagnetic member, said reference member being connected with the focusing device to be displaced by operation of the focusing device.

4. An exposure control system for a camera mechanism for affording an appropriate overall exposure of a scene being photographed, comprising flash illumination means, exposure control means including a shutter means combined with an iris device forming a diaphragm aperture during opening of the shutter means, trigger circuit means for said flash illumination means; said circuit means having variable resistor means variable by said focusing means, a capacitor forming a time constant circuit connected with said variable resistor means, switching means having an input connected with a terminal of said capacitor, said illumination means being triggered by said switching means, and a short-circuiting switch across said capacitor and coupled to be opened by opening of said exposure control device with a control circuit for controlling the opening and closing time of said exposure control means; time control circuit including a photoelectric conversion element responsive to the brightness of a scene for producing a quantity of electricity in response to intensity of illumination of an object being photographed, a second capacitor for a constant circuit connected with said photoelectric conversion element, a short-circuiting switch of said second capacitor, said switch being opened and closed in response to the opening and closing action of said exposure control means, the second switching means being connected its input with a terminal of said second capacitor, and a retaining means being connected with said switching means for closing a shutter means by actuation of said switching means, wherein said flash light illumination means is illuminated wherein said shutter means reaches an opening responding to the main object portion of an object to be photographed, and said shutter means is closed after the time corresponding to an average photometry value of an object to be photographed.

5. An exposure control system of a camera mechanism according to claim 4 wherein said first and second switching means form a single switching arrangement, the first and second capacitors form a single capacitor system, the first and the second short-circuiting switches form a single switching arrangement, said switching means contains a uni-junction transistor connected with a terminal of a capacitor, and a switching member connected between said variable resistor means and a capacitor, said switching member is connected by means of the output of a switching means.

6. An exposure control system for a camera according to claim 4, wherein said switching means has a semiconductor controlled rectifier and a photoelectric conversion element to receive a flash light for converting said flash light into an electric signal and a switching element connected with said conversion element to be switch controlled, a rotary flow circuit connected with said rectifier for setting said rectifier into non-conductive condition.

7. An exposure control system for a camera according to claim 4, wherein said trigger circuit means further includes an iris device mounted in front of a photoelectric conversion element for photometry to the main object portion of an object being photographed, said iris device being coupled with said shutter means and set in response to the opening of a shutter means and when the shutter means is opened, said conversion element performing average photometry of both the principal object being photographed as well as the background.

8. An exposure control signal of a camera mechanism according to claim 4 wherein said control circuit further includes retaining switching means being connected between said switching means and a capacitor, said retaining switching means is normally nonconductive and is commonly controlled by a switching means of said trigger circuit means while said means becomes conductive by interlocking with a flash light means being triggered.

9. An exposure control system for a camera having a flash comprising:
    first circuit means including a photoelectric member responsive to light from the scene being photographed, second circuit means coupled to the flash for providing an electrical value corresponding to light upon a photographic subject of the scene, third circuit means including a signal means for causing said signal means to produce a signal representing an exposure factor in dependence upon electrical condition on said second circuit means, switch means coupled to each of said circuit means for alternately coupling said first circuit means and said second circuit means to said third circuit means so that said first and second circuit means alternately vary the electrical conditions in said third circuit means on the basis of conditions in said first and second circuit means and variable means in one of said circuit means and responsive to a second exposure factor for varying the electrical conditions in the one of said circuit means so that the signals for each position of the switch means can be made equal to each other.

10. A system as in claim 9, wherein said variable means includes a light restricting iris in the path of light to the photoelectric member and variable in response to the second exposure factor.

11. A system as in claim 9, wherein said signal means forms said signal in the form of deflection of movable indicator, and wherein said first circuit means includes a second indicator adapted to be set in response to an exposure factor so that the indicators can be aligned with each other in response to variation in light from the flash.

12. A system as in claim 9 wherein said signal means forms said signal in the form of deflection of a movable indicator, and wherein said first circuit means includes a second indicator adapted to be set in response to intensity of light of the flash so that the indicators can be aligned with each other in response to an exposure factor.

13. For operation with various shutter speeds and diaphragm values as well as other exposure factors, in response to light from an object and for use with a flash device, a camera comprising:
    first exposure control circuit means for obtaining a first electrical signal corresponding to a diaphragm value for appropriate exposure in a daylight mode and based on other exposure values to be preset, the said exposure control circuit means having;
    a photo transducing element adapted to receive light from an object,
    presetting means for presetting another exposure value, and
    a control circuit operatively connected with the transducing element and the presetting means for forming the first electrical signal;
    second exposure control circuit means for obtaining a second electrical signal corresponding to the diaphragm value for proper exposure in a flash mode based on light emission from the flash device;
    selecting means for selecting one of the first exposure control circuit means and the second exposure control means; and
    indicating means connectable with one of the first exposure control circuit means and the second exposure control circuit means through the selecting means, for indicating the diaphragm value for appropriate exposure through the adjustment of the presetting means in the daylight and flash light modes.

14. A camera according to claim 13, wherein said setting means includes film speed setting means connected with said first exposure circuit means and said second exposure circuit means.

15. A camera according to claim 13, wherein said selecting means includes automatic changeover means for repeated changeover operation in the flash mode.

16. A camera according to claim 13, wherein said second exposure circuit means comprises distance setting means for forming an electrical signal in accordance with the distance to the object.

17. A camera according to claim 13, wherein said indicating means are adapted to be observed in a viewfinder which has an indicating device for indicating a preset diaphragm value of the camera in the viewfinder.

18. An exposure control system for a camera and a flash device comprising:
    (A) exposure control means for defining an aperture;
    (B) aperture means operatively connected said exposure control means so as to be automatically adjusted thereby;
    (C) said exposure control means including
        (c1) first circuit means having a photoelectric conversion element for converting a brightness of the overall scene into an electrical signal and shutter speed information setting means,
        (c2) second exposure control circuit means having a variable register means variable in response to the distance to the principal object of the scene,
        (c3) exposure defining means operatively associated with said aperture means, the defining means having an electro-mechanical transducing means to produce a mechanical displacement by applying an electrical signal therein,
(c4) switching means for selectively connecting said exposure defining means with said first circuit means and second circuit means;
(D) said aperture means being operatively associated with the electro-mechanical transducing means for adjusting the aperture thereof responsive to the displacement.

19. An exposure control system of a camera mechanism according to claim 18 wherein said switching means includes a chopper for continuous switchover.